United States Patent [19]

Ishida et al.

[11] Patent Number: 5,144,357
[45] Date of Patent: * Sep. 1, 1992

[54] AUTOMATIC FOCUS DETECTING MEANS

[75] Inventors: Tokuji Ishida; Toshio Norita; Masataka Hamada; Hiroshi Ootsuka, all of Osaka, Japan

[73] Assignee: Minolta Camera Kabushiki Kaisha, Osaka, Japan

[*] Notice: The portion of the term of this patent subsequent to Feb. 27, 2007 has been disclaimed.

[21] Appl. No.: 630,887

[22] Filed: Dec. 20, 1990

Related U.S. Application Data

[62] Division of Ser. No. 267,304, Nov. 4, 1988, Pat. No. 4,999,841.

[30] Foreign Application Priority Data

Nov. 6, 1987 [JP] Japan .................. 62-280482

[51] Int. Cl.$^5$ .................. G03B 13/36; G02B 7/34
[52] U.S. Cl. .................. 354/402; 250/201.2
[58] Field of Search .............. 354/402, 406, 407, 408; 250/201.2, 201.8

[56] References Cited

U.S. PATENT DOCUMENTS

| | | |
|---|---|---|
| Re. 32,376 | 5/1861 | Mayall . |
| 4,083,056 | 4/1978 | Nakamura et al. . |
| 4,203,031 | 5/1980 | Kamachi et al. . |
| 4,284,335 | 8/1981 | Takemae et al. . |
| 4,341,953 | 7/1982 | Sakai et al. . |
| 4,373,791 | 2/1983 | Araki . |
| 4,415,246 | 11/1983 | Karasaki et al. . |
| 4,416,523 | 11/1983 | Kawabata . |
| 4,423,936 | 1/1984 | Johnson . |
| 4,550,993 | 11/1985 | Taniguchi et al. . |
| 4,560,863 | 12/1985 | Matsumura et al. . |
| 4,561,750 | 12/1985 | Matsumura . |
| 4,563,576 | 1/1986 | Matsumura et al. . |
| 4,575,211 | 3/1986 | Matsumura et al. . |
| 4,589,031 | 5/1986 | Tsuji . |
| 4,614,418 | 9/1986 | Ishizaki et al. . |
| 4,614,975 | 9/1986 | Kaite . |
| 4,636,624 | 1/1987 | Ishida et al. .......... 354/406 X |
| 4,650,309 | 3/1987 | Ishida et al. . |
| 4,659,917 | 4/1987 | Suzuki et al. . |
| 4,664,495 | 5/1987 | Alyfuku et al. . |
| 4,681,419 | 7/1987 | Sakai et al. . |
| 4,687,917 | 8/1987 | Kusaka et al. . |
| 4,716,434 | 12/1987 | Taniguchi et al. . |
| 4,768,052 | 8/1988 | Hamada et al. .......... 354/402 |
| 4,772,912 | 9/1988 | Ishida et al. . |
| 4,792,819 | 12/1988 | Akashi . |
| 4,792,821 | 12/1988 | Akashi . |
| 4,905,032 | 2/1990 | Ishida et al. .......... 354/402 |

FOREIGN PATENT DOCUMENTS

| | | |
|---|---|---|
| 58-49844 | 11/1983 | Japan . |
| 58-224318 | 12/1983 | Japan . |
| 59-30510 | 2/1984 | Japan . |
| 59-48719 | 3/1984 | Japan . |
| 59-67505 | 4/1984 | Japan . |
| 59-107311 | 6/1984 | Japan . |
| 59-123822 | 7/1984 | Japan . |
| 59-129810 | 7/1984 | Japan . |

(List continued on next page.)

*Primary Examiner*—W. B. Perkey
*Attorney, Agent, or Firm*—Burns, Doane, Swecker & Mathis

[57] ABSTRACT

An automatic focus condition detecting device comprising an objective lens; a unit for receiving light from an object through the objective lens; a focus detecting unit responsive to the output of the receiving unit for detecting a focusing condition of the objective lens; a unit responsive to the output of the receiving unit for judging whether or not it is possible for the focus detecting unit to detect a focusing condition of the objective lens; a lens position detecting unit for detecting whether or not the objective lens is positioned within a predetermined range included in the lens driving range; a unit for driving the objective lens; and a unit for controlling the driving unit to drive the objective lens when the judging judges that it is impossible for the focus detecting unit to detect a focusing condition and, moreover, the lens detecting unit detects that the objective lens is positioned within the predetermined range, for the purpose of a search a lens position where the focus detecting unit can detect a focusing condition.

8 Claims, 19 Drawing Sheets

FOREIGN PATENT DOCUMENTS

| | | |
|---|---|---|
| 59-146032 | 8/1984 | Japan . |
| 60-14211 | 1/1985 | Japan . |
| 60-37509 | 2/1985 | Japan . |
| 60-101514 | 6/1985 | Japan . |
| 60-120675 | 6/1985 | Japan . |
| 60-144711 | 7/1985 | Japan . |
| 60-256112 | 12/1985 | Japan . |
| 61-29813 | 2/1986 | Japan . |
| 61-55618 | 3/1986 | Japan . |
| 61-70407 | 4/1986 | Japan . |
| 62-14015 | 1/1987 | Japan . |
| 62-67971 | 3/1987 | Japan . |
| 62-95511 | 5/1987 | Japan . |
| 62-138808 | 6/1987 | Japan . |
| 62-166309 | 7/1987 | Japan . |
| 62-173413 | 7/1987 | Japan . |
| 62-189415 | 8/1987 | Japan . |
| 62-204247 | 9/1987 | Japan . |
| 63-10135 | 1/1988 | Japan . |
| 63-10136 | 1/1988 | Japan . |

Fig. 11
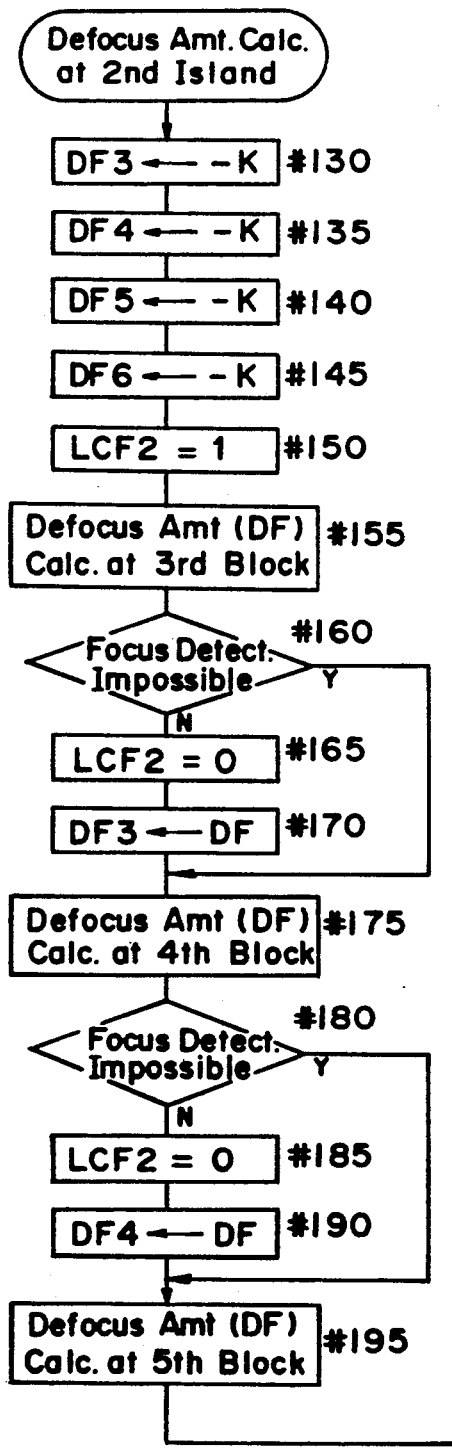
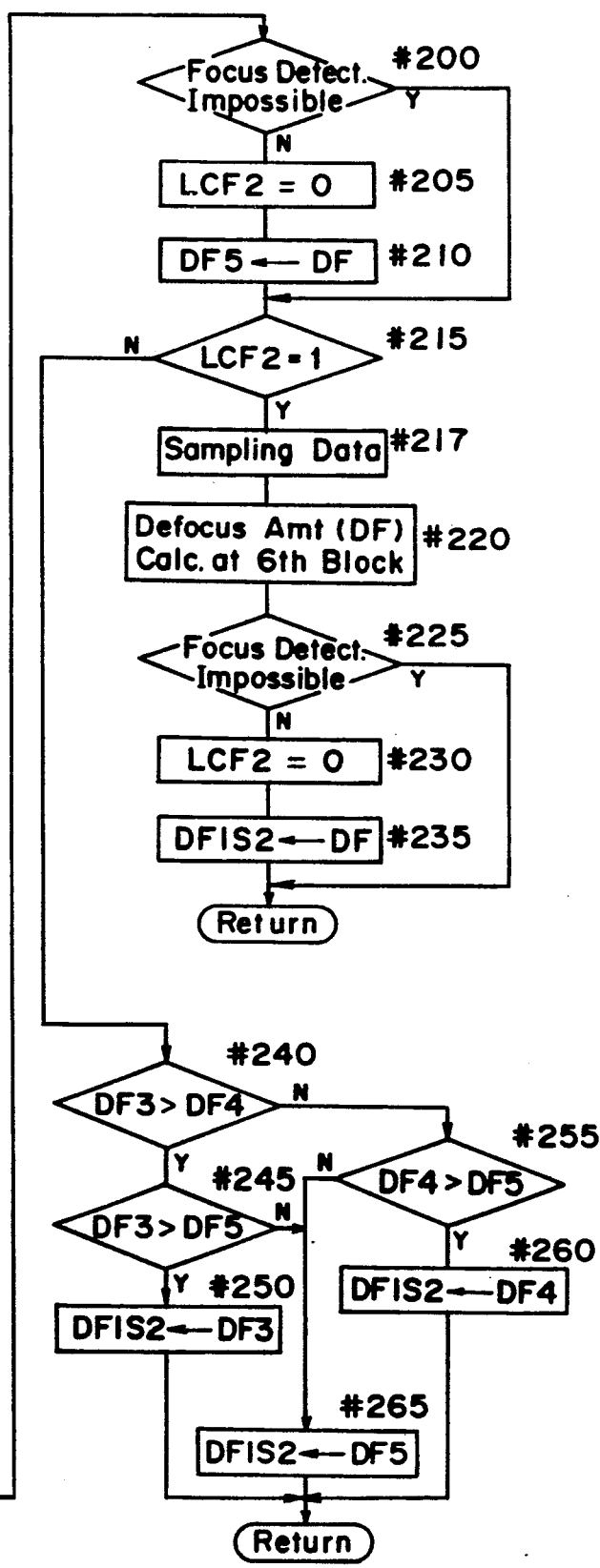

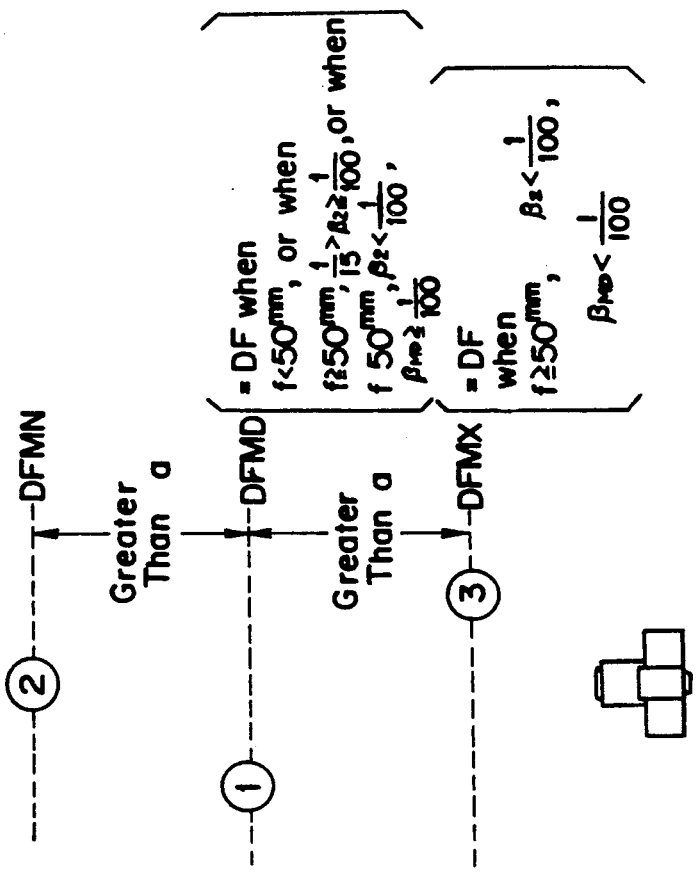
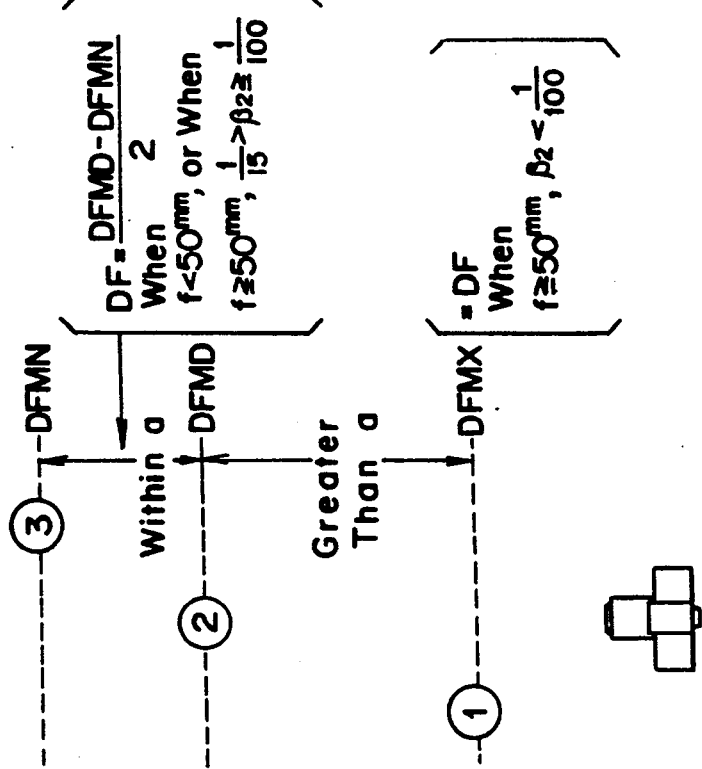

AUTOMATIC FOCUS DETECTING MEANS

BACKGROUND OF THE INVENTION

1. Field of the Invention

The present invention generally relates to an automatic focus detecting device having a focus detecting area and, more particularly, to the automatic focus detecting device which can be practiced in a single lens reflex camera or a video camera having an AF function of accomplishing an automatic focusing by discriminating a object to be photographed or videoed within the field of view.

2. Description of the Prior Art

Hitherto, an automatic focus adjusting device is widely used which is operable to move the photo-taking lens to an infocus position on the basis of a result of focus detection carried out by a focus detecting means. In such automatic focus adjusting device, when the photo-taking lens is moved to the infinity position, where the lens is focused on an object at infinity, it may happen that the focus detection of an object close to the camera cannot be achieved. In view of this, the use of a limit switch has been made to detect the arrival of the photo-taking lens at the infinity position or the closest position so that, in the event that the focus detection is disabled and it is detected the arrival of the lens at the infinity position or the closest position, the photo-taking lens can be moved in a reverse direction to search for the object which can be automatically focused. This is disclosed in, for example, the Japanese Laid-open Patent Publication No. 58-224318 published in 1983.

Also, an attempt has been proposed in, for example, the Japanese Laid-open Patent Publication No. 59-48719 published in 1984 wherein, even though the photo-taking lens is not held at the infinity position or the closest position, in the event of the incapability of the focus detection, the photo-taking lens can be moved so that the direction of movement of the lens can be determined depending on the position at which the photo-taking lens is brought to a halt.

In the meantime, depending on the type of and the focal length of the lens, no focus detection is possible with respect to a main object occupying a position close to the camera. This is particularly true when the photo-taking lens is moved to the infinity position. In such case, the following problem will arise. Assuming that the main object and other objects distant from the main object are found within the focus detecting area, and if the photo-taking lens is moved to the infinity position at this time, focus detection is possible with respect to such other objects while the focus detection is impossible with respect to the main object.

SUMMARY OF THE INVENTION

In view of the foregoing, the present invention is intended to substantially solve the above discussed problems and also to provide an improved automatic focus detecting device which is effective to focus the main object at all times so that the photo-taking can be achieved as aimed by the photographer.

BRIEF DESCRIPTION OF THE DRAWINGS

This and other objects and features of the present invention will become clear from the following description taken in conjunction with a preferred embodiment thereof with reference to the accompanying drawings, in which:

FIGS. 8 to 24 are flowcharts showing the sequence of operation of the control circuit; and FIGS. 25 (a) to 25(h) are diagram used to explain various distance distributions of target objects desired to

DETAILED DESCRIPTION OF THE EMBODIMENT

Before the detailed description of a preferred embodiment of the present invention proceeds, the principle auto-focus adjustment according to the present invention necessitated to accomplish the previously described object will first be described with reference to FIG. 1.

Figure 1:
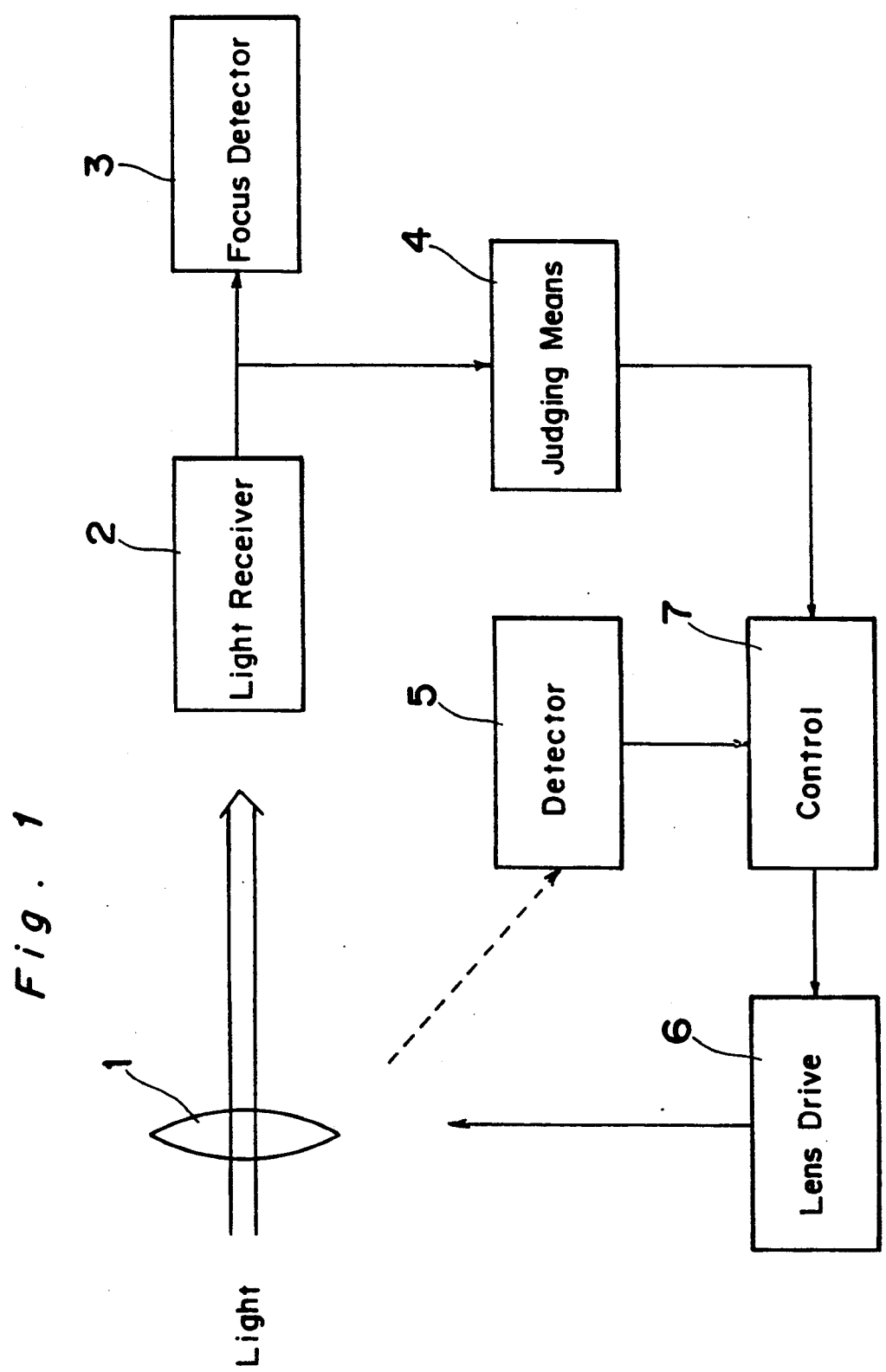
FIG. 1 is a schematic block diagram showing the principle of the present invention.

Referring to FIG. 1, reference numeral 1 represents a photo-taking lens for forming an image of an object to be photographed on a image recording medium such as, for example, a photographic film (not shown). Reference numeral 2 represents a light receiving means for receiving rays of light reflected from an object (not shown) through the photo-taking lens 1. Reference numeral 3 represents a focus detecting means for detecting a focusing condition of the photo-taking lens 1 on the basis of an output from the light receiving means 2. Reference numeral 4 represents a judging means for determining whether or not the focus detecting means 3 can detect the focusing condition of the photo-taking lens, on the basis of the output from the receiving portions of the light receiving means 2. Reference numeral 5 represents a detecting means for detecting the position of the photo-taking lens 1 or the focal length of the photo-taking lens 1. Reference numeral 6 represents a driving means for moving the photo-taking lens 1. Reference numeral 7 represents a controlling means operable in response to the judging means 4 and the detecting means 5 to control the driving means.

In the automatic focus detecting device of the above described construction, in the event the incapability of the focus detecting means 3 to detect the focusing condition is determined by the judging means 4 and also in the event that the detecting means 5 indicates that the photo-taking lens 1 is within a predetermined area or that the focal length of the photo-taking lens 1 is shorter than a predetermined value, the controlling means 7 controls the driving means 6 to move the photo-taking lens 1. Accordingly, the main object is focused at all times, and, therefore, the photo-taking can be achieved as aimed by the photographer.

Figure 2:
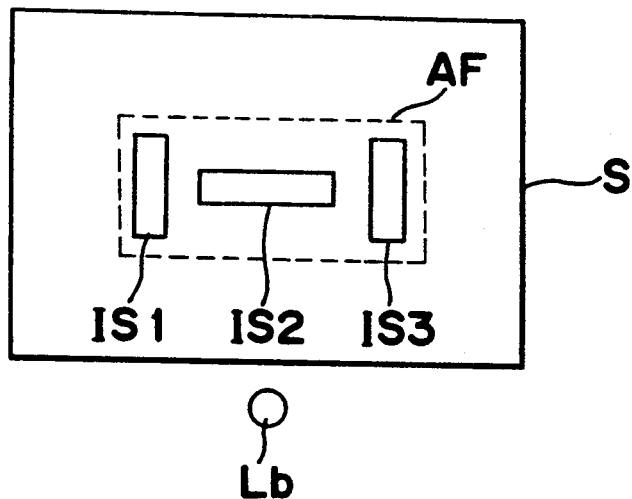
FIG. 2 is a diagram showing a view made through a viewfinder of an automatic focus adjusting device according to one embodiment of the present invention.

Referring now to FIG. 2, there is shown a display obtained relative to the field of view through a viewfinder of a photographic camera utilizing an auto-focus adjusting device of the present invention. In the illustrated example, focus detection is possible at three areas IS1, IS2 and IS3 (which are hereinafter referred to as first, second and third islands, respectively) shown by solid-lined rectangular areas depicted in a central region of the field S of view. A rectangular frame AF shown by the dotted lines in FIG. 2 represents a viewable display used to indicate to a photographer that the focus detection can take place within the area bound by the rectangular frame AF. A display portion Lb depicted outside the field S of view is used to indicate a focus detecting condition and can be lit when in the infocus condition.

Figure 3:
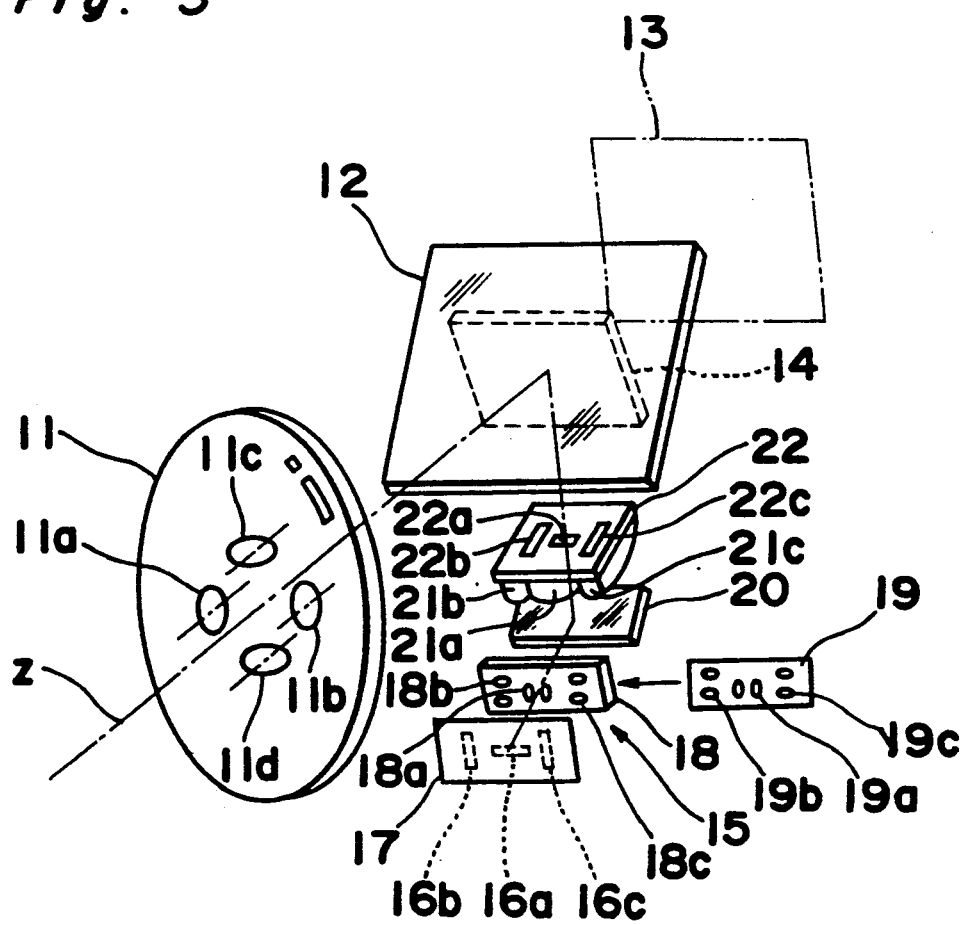
FIG. 3 is a perspective view of a focus detecting optical system used in the automatic focus adjusting device.

FIG. 3 illustrates, in schematic representation, the details of a multi-area focus detecting module having the above described focus detecting areas. Reference numeral 11 represents the photo-taking lens; reference numeral 12 represents a main mirror; reference numeral 13 represents a film plane; reference numeral 14 represents a sub-mirror; and reference numeral 15 represents a focus detecting optical system. Reference numeral 22 represents a field throttling member disposed in the vicinity of a focal plane and having rectangular openings 22a, 22b and 22c defined therein. Reference numerals 21a, 21b and 21c represent respective condenser lenses; reference numeral 20 represents a module mirror; reference numerals 18a, 18b and 18c represent respective separator lens pairs; and reference numerals 16a, 16b and 16c represent respective CCD imaging arrays disposed in a focal plane 17 of the separator lenses. Reference numeral 19 represents a throttling mask having circular or oval openings 19a, 19b and 19c defined therein. An image whose view is restricted by the rectangular opening 22a in the field throttling member 22 is, after having passed through the condenser lens 21a, projected by means of the opening 19a in the throttling mask and the separator lens pair 18a onto the CCD imaging array 16a to form two images thereon. If the interval between these two images coincides with a predetermined interval, it means an infocus condition; if it is narrower than the predetermined interval, it means a front focus condition; and if it is broader than the predetermined interval, it means a rear focus condition. Images of the respective openings 19b and 19c in the field throttling member 19 are similarly projected onto the CCD imaging arrays 16b and 16c by means of the condenser lenses 21b and 21c and the separator lens pairs 18b and 18c, respectively.

Figure 4A:
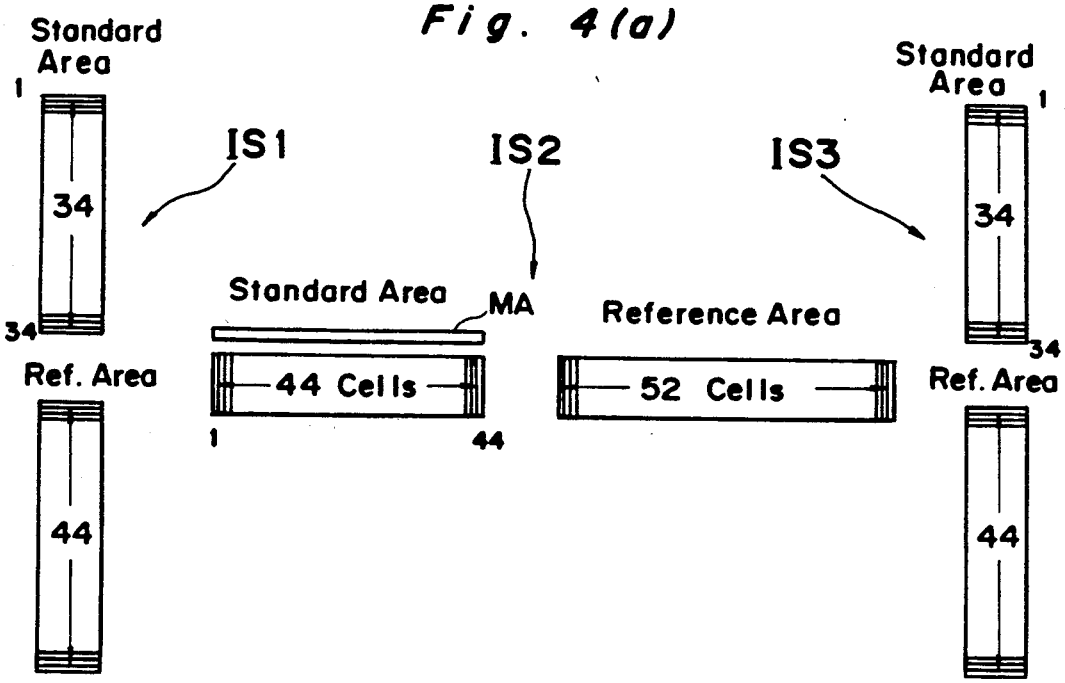
FIGS. 4(a) and 4(b) are diagrams showing arrangements of CCD chips used in the automatic focus adjusting device.

FIG. 4(a) illustrates a light receiving portions of the CCD imaging arrays used in this focus detecting device. (For the purpose of discussion, combinations of the light receiving portions and accumulating portions will be hereinafter referred to as CCD.) With respect to each of the islands IS1, IS2 and IS2 shown in FIG. 2, there are provided standard and reference areas. A light receiving element MA for monitoring purpose for controlling the integrating time required to accomplish an integration into an accumulating portion of CCD is provided along one side of the standard area of the intermediate island IS2 so as to extend parallel to the lengthwise direction of the island IS2. The numbers X and Y of cells in the standard and reference areas in each of the first to third islands IS1, IS2 and IS3 are chosen to be 34 and 44 in the first island IS1, respectively; 44 and 52 in the second island IS2, respectively; and 34 and 44 in the third island IS3, respectively. Those are all formed on the same chip.

In the focus detecting device according to the illustrated embodiment, the reference area of each island is divided into a plurality of blocks and each of the blocks of the reference area in each island is compared with the reference area to accomplish the focus detection. Of results of focus detection at each block, a data representative of the rearmost focus condition is utilized as a focus detecting data obtained from each island and, based on the result of focus detection from these islands and a data representative of a photo-taking magnification, a focus detecting data of the photographic camera is calculated, the details of which will be described later.

Figure 4B:
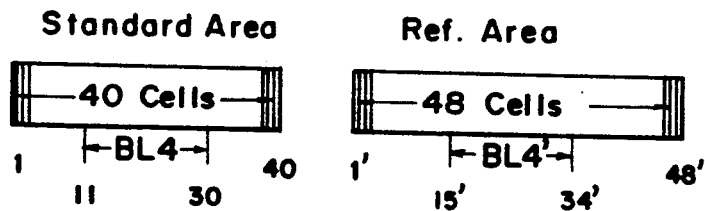
Figure 5:
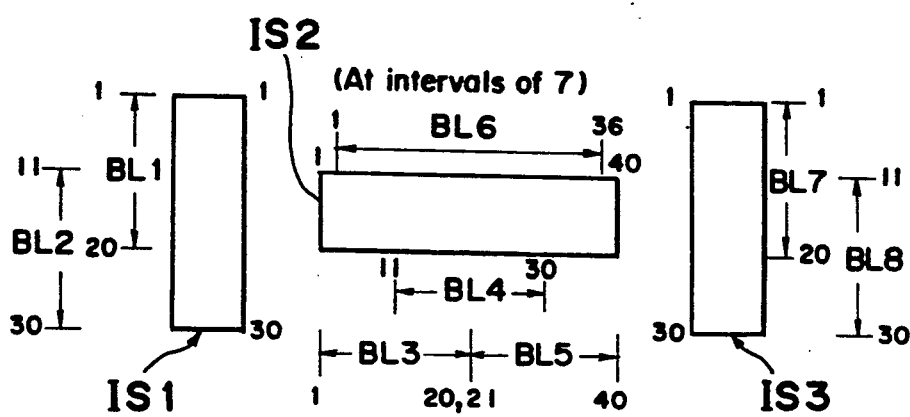
FIG. 5 is a diagram used to explain the division of a reference area/of the CCD chips shown in FIG. 4.
Figure 6:
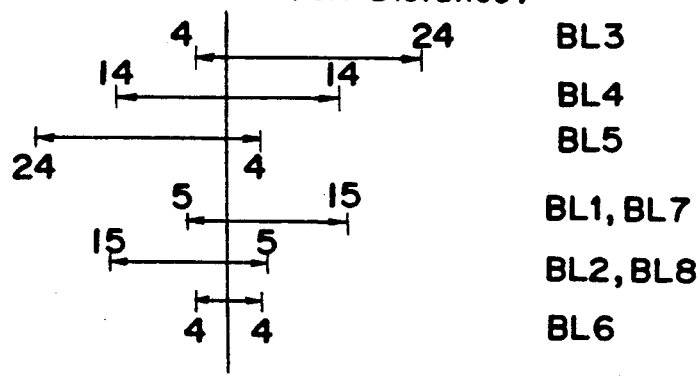
FIG. 6 is a diagram showing amount of shifts in the divided areas of the CCD chips.

The range over which the division is made and defocus regions of the divided islands are shown in FIGS. 5, 6 and 4(b) and will now be described with reference thereto. FIG. 5 illustrates, on an enlarged scale, the focus detecting area on the field of view shown in FIG. 2. The islands IS1, IS2 and IS3 used for the focus detection are represented by the reference areas shown in FIG. 4(a). It is to be noted that numerals used in connection with each of the islands in FIG. 5 represent the number of differences in difference data taken at intervals of 3 of CCD cells shown in FIG. 4(a). (The difference data may be taken at intervals of 2 or 1, although the number thereof may vary.) Accordingly, the numbers X and Y of the standard and reference areas in each of the islands are 30 and 40 in the island IS1, respectively; 40 and 48 in the island IS2, respectively; and 30 and 40 in the island IS3, respectively. The island IS1 is divided into first and second blocks BL1 and BL2, the first block BL1 being allocated 1 to 20 and the second block BL2 being allocated 11 to 30 from the difference date at top thereof. The island IS2 is divided into third, fourth and fifth blocks BL3, BL4 and BL5 which are allocated 1 to 20, 11 to 30 and 21 to 40, respectively, from the difference date at the left-hand end. The island IS3 is divided into seventh and eighth blocks BL7 and BL8 which are allocated 1 to 20 and 11 to 30 from the difference data at top thereof. So far as the illustrated embodiment is concerned, at the second island, the focus detecting calculation is carried out with the use of data in which the sampling frequency is modified in favor of a low frequency object, more specifically, with the use of the difference data taken at intervals of 7 of the cell data. The number of the difference data in the standard area is taken from all data of the CCD output at intervals of 7 and is therefore 36, whereas the number of the difference data in the reference area is taken from all data of the CCD output at interval of 7 and is therefore 44. If the interval between the difference data is greater than the above described interval, the low frequency region will be enhanced, however, it is contemplated twice in the illustrated embodiment. This block is rendered the sixth block BL6.

As far as the focus detection according to this phase difference detection system is concerned, the rear focus condition will occur if the image interval between images falling on the standard and reference area which is attained when these images match together is greater than a predetermined interval; the front focus condition will occur if the image interval between the images attained when the images match together is smaller than the predetermined interval; and the infocus condition will occur if the image interval matches with the predetermined interval. Accordingly, the defocus range in the divided blocks will cover the rear focus side as the block goes a distance away from the optical center within each island. To describe in detail with reference to FIG. 4(b) illustrating the condition after the difference data have been taken out, FIG. 4(b) illustrates the standard and reference areas of the island IS2 and reference is now made to the defocus range of the fourth block BL4. Under these circumstances, when an image falling on the fifteenth to thirty-fourth cells (BL4') counted from the left-hand end of the reference area matches with an image falling on the fourth block BL4, the infocus condition occur. However, if the coincidence of the images occurs at a portion of the reference area leftwardly therefrom, the front focus condition occurs at which time the maximum number of data (hereinafter referred to as the pitch of deviation) of the front focus will be 14. On the other hand, if the coincidence of the images occur at a portion of the reference area rightwardly from the illustrated position, the rear focus condition occurs with the maximum pitch of deviation of the rear focus being 14. This equally applied to the defocus range divided into blocks in each of the other islands. More specifically, with reference to FIG. 6, the pitches of deviation towards the front focus and towards the rear focus are 4 and 24, respectively, in the third block BL3, and the pitches of deviation towards the front focus and towards the rear focus are 24 and 4, respectively, in the fifth block BL5. With respect to the first and third islands IS1 and IS3, the pitches of deviation towards the front focus and towards the rear focus in the first and seventh blocks BL1 and BL7 are 5 and 15, respectively; and the pitches of deviation towards the front focus and towards the rear focus in the second and eighth blocks BL2 and BL8 are 15 and 5, respectively. In the sixth block BL6, the pitches of deviation towards both of the front focus and the rear focus are 4 pitches. It is to be noted that, in the description to follow, reference characters used to designate each of the islands IS1, IS2 and IS3 and each of the blocks BL1 to BL8 will not be employed.

Figure 7:
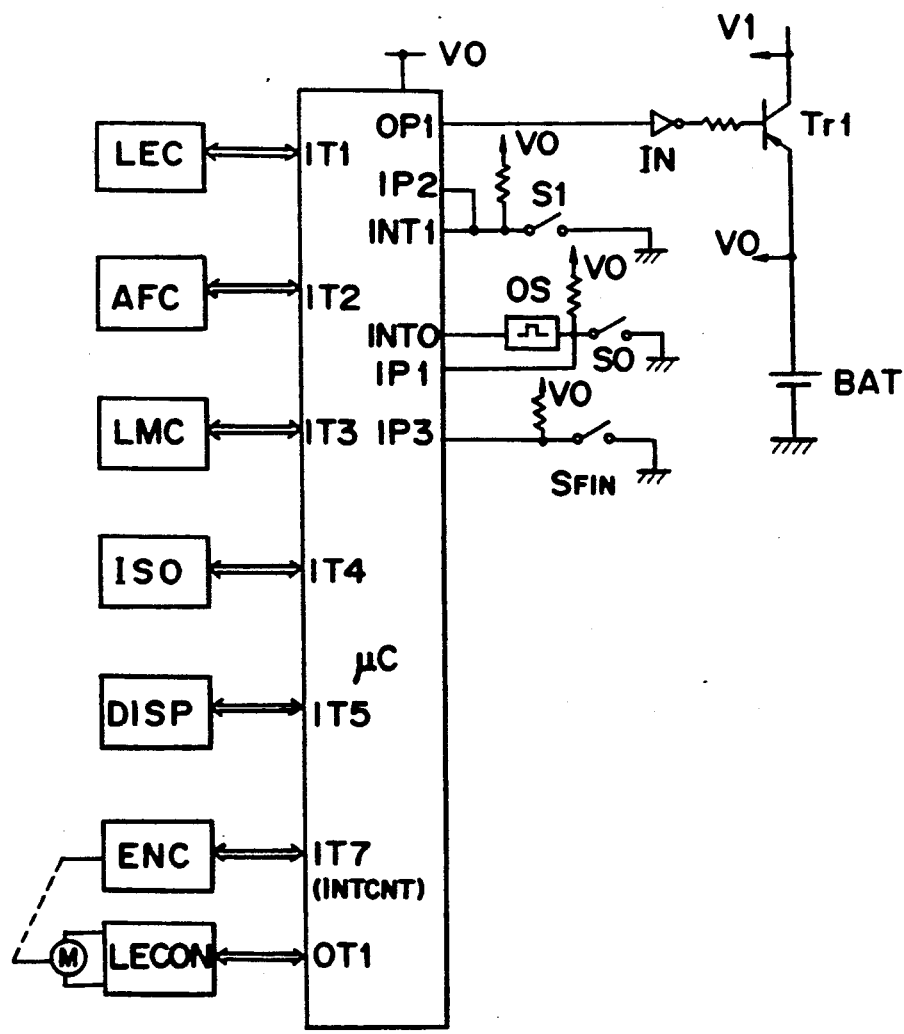
FIG. 7 is a schematic circuit diagram showing a control circuit used in the automatic focus adjusting device.

FIG. 7 illustrates a block circuit of the photographic camera as a whole. Reference character $\mu$C represents a microcomputer operable to perform various calculations for controlling the sequence of the camera as a whole, for an exposure, and also for the focus detection. Reference character LEC represents a lens circuit built in an interchangeable lens adapted to be mounted on a camera body (not shown) for providing the camera with information peculiar to the interchangeable lens. Reference character AFC represents a focus detection output circuit including CCD capable of receiving rays of light having passed through the lens and converting them into electric analog signals so that the output circuit AFC can, after having converted the analog signal into digital signals, provide the microcomputer $\mu$C with the digital signal. Reference character LMC represents a luminance detecting circuit for metering the rays of light passed through the lens for the detection of the brightness of an object to be photographed, said luminance detecting circuit LMC being capable of outputting to the microcomputer $\mu$C a digital signal Bvo based on the APEX system and corresponding to the brightness of the object. Reference character ISO represents a film sensitivity read-out circuit for outputting to the microcomputer $\mu$C a digital signal of APEX system corresponding to the sensitivity of a film used in the camera. Reference character DISP represents a display circuit for displaying exposure information and the focusing condition of the lens. Reference character ENC represents an encoder for detecting the amount of rotation of a motor M and for outputting a pulse (a pulse outputted in correspondence with a predetermined amount of rotation of the motor M) to a lens control circuit LECON as will be described later. The lens control circuit LECON is adapted to receive both of a signal descriptive of the direction of drive of the motor and a control signal necessary to stop the motor from the microcomputer $\mu$C and for driving the motor M on the basis of these signals. The microcomputer $\mu$C has built therein a counter for detecting the position to which the lens is moved forwards from the infinity position, which counter is capable of performing a count-up or count-down operation in response to the pulse from the encoder when so commanded by an internal command. This counter can be reset by an internal command when the lens is moved rearwards to the infinity position during the movement of the lens effected when a main switch S0 a will be described later is turned on.

Reference character BAT represents a battery power source for providing an electric power to the microcomputer $\mu$C and other switches as will be described later. Reference character Tr1 represents a power supply transistor for effecting the supply of an electric power to all of the circuit component parts except for the microcomputer $\mu$C. Reference character S0 represents a switch adapted to be turned on and off by the manipulation of a main switch (not shown). A one-shot circuit OS is operatively associated with the on/off of the switch S0 to output respective pulses to the microcomputer $\mu$C. The microcomputer $\mu$C executes an interruption flow INT0 as will be described later when the pulses are supplied thereto from the one-shot circuit OS. Reference character $S_{FIN}$ represents a switch adapted to be closed when the lens is moved to the infinity position or to the foremost position. However, without this switch $S_{FIN}$, it is possible to know, when the pulses from the encoder is not inputted for a length of time greater than a predetermined time during the movement of the lens towards the infinity position, that the lens is moved to the infinity position or to the foremost position.

Figure 20:
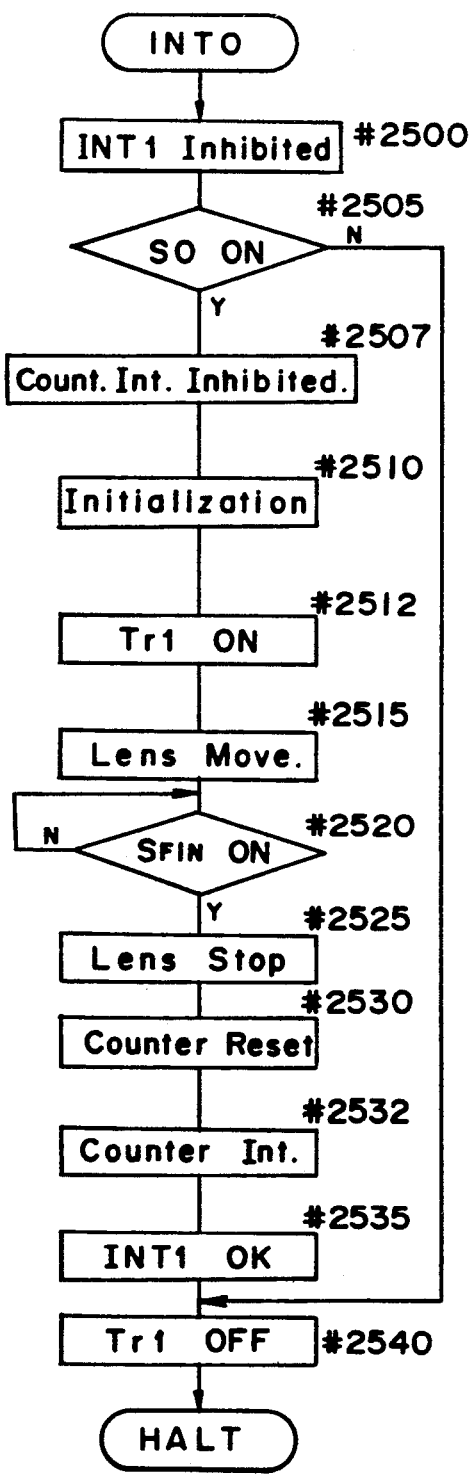

The operation of the camera will now be described in terms of the sequence of operation of the microcomputer $\mu$C. When the main switch S0 is closed, the pulse is outputted from the one-shot circuit OS to an interruption input terminal INT0 causing the microcomputer $\mu$C to execute an interruption routine shown in FIG. 20. The microcomputer $\mu$C inhibits the interruption INT1 which will take place when a photo-taking ready switch S1 is closed at step #2500 and then makes a decision at step #2505 to determine in reference to the level at a terminal IP1 as to whether this interruption results from the closure of the main switch S0 or whether it results from the opening of the main switch S0. If the terminal IP1 is in a logic high level state, it means that the interruption has resulted from the opening of the main switch S0 and, therefore, in order to stop the operation of all of the circuits, a terminal OP1 is rendered in a low level state and an output from an inverter IN is rendered in a high level state to switch the power supply transistor Tr1 off, thereby to establishing a halt condition (the condition in which the operation is stopped) at step #2540. On the other hand, if the terminal IP1 is in a low level state, it means that the interruption has resulted from the closure of the main switch S0 and, therefore, a counter interruption is inhibited (as will be described later) at step #2505, followed by step #2510 during which flags and output terminals are initialized and the terminal OP1 is rendered in a high level state to switch the power supply transistor Tr1 on at step #2512. Then, in order to effect the control to move the lens rearwards, a drive signal necessary to move the lens rearward is outputted to the lens control circuit LECON at step #2515. As a result thereof, the lens is driven until it assumes the infinity position at which the switch $S_{FIN}$ is closed at step #2520. If a result of decision at step #2520 indicates that the lens has been moved to the infinity position, that is, the switch $S_{FIN}$ has been closed, a lens stop signal is outputted at step #2525. Incident thereto, a counter for indicating the amount of movement of the lens from the infinity position is reset at step #2530, permitting the counter interruption to take place at step #2532. Thereafter, an interruption resulting from the closure of the photo-taking ready switch S1 is permitted at step #2535, and in order to switch the power supply transistor Tr1 off, the terminal OP1 is rendered in a low level state to establish the halt condition at step #2540.

Reference character S1 represents the photo-taking ready switch adapted to be closed by the manipulation of a release button (not shown). When this switch S1 is closed, a signal varying from a high level state to a low level state is inputted to the interruption input INT1, and the microcomputer $\mu C$, when detecting such signal, executes an interruption routine INT1 shown in FIG. 8.

The microcomputer $\mu C$ initializes the various flags, output ports and others and then reset and start a built-in hard timer at step #517. Then, a flag AFSF indicative of the first cycle of focus adjusting operation is set at step #8 and, in order to switch the power supply transistor TR1 on, the terminal OP1 is rendered in a high level state at step #10. Subsequently, lens data (such as the focal length, the full-open aperture value, a coefficient necessary to convert the defocus amount into the number of pulses for driving the lens and others) are inputted from the lens circuit LEC at step #15, followed by integration taking place in the focus detection data output circuit AFC at step #20. After the integration, data from the focus detection data output circuit AFC are inputted and are stored as difference data taken at intervals of 3 at step #25. Then, the defocus amount at each island is calculated at step #30, followed by step #35 at which the exposure calculation is performed. Thereafter, at step #40, the focusing condition and the exposure information are displayed. At subsequent step #45, the defocus amount used to drive the lens is calculated from the defocus amounts at the respective islands, followed by the actual drive of the lens according to the result of calculation. Thereafter, and at step #50, a decision is made to determine if the switch S1 is closed in reference to the logic level state at the terminal IP2. If the terminal IP2 is in a low level state, that is, the switch S1 is closed, the flag AFSF indicative of the first cycle of focus adjusting operation is reset at step #57 with the program flow returning to step #15 to repeat the subsequent program flow. On the other hand, if the terminal IP2 is in a high level state, that is, the switch S1 is opened, the terminal OP1 is rendered in a low level state with the microcomputer $\mu C$ brought to a halt at step #55.

Figure 8:
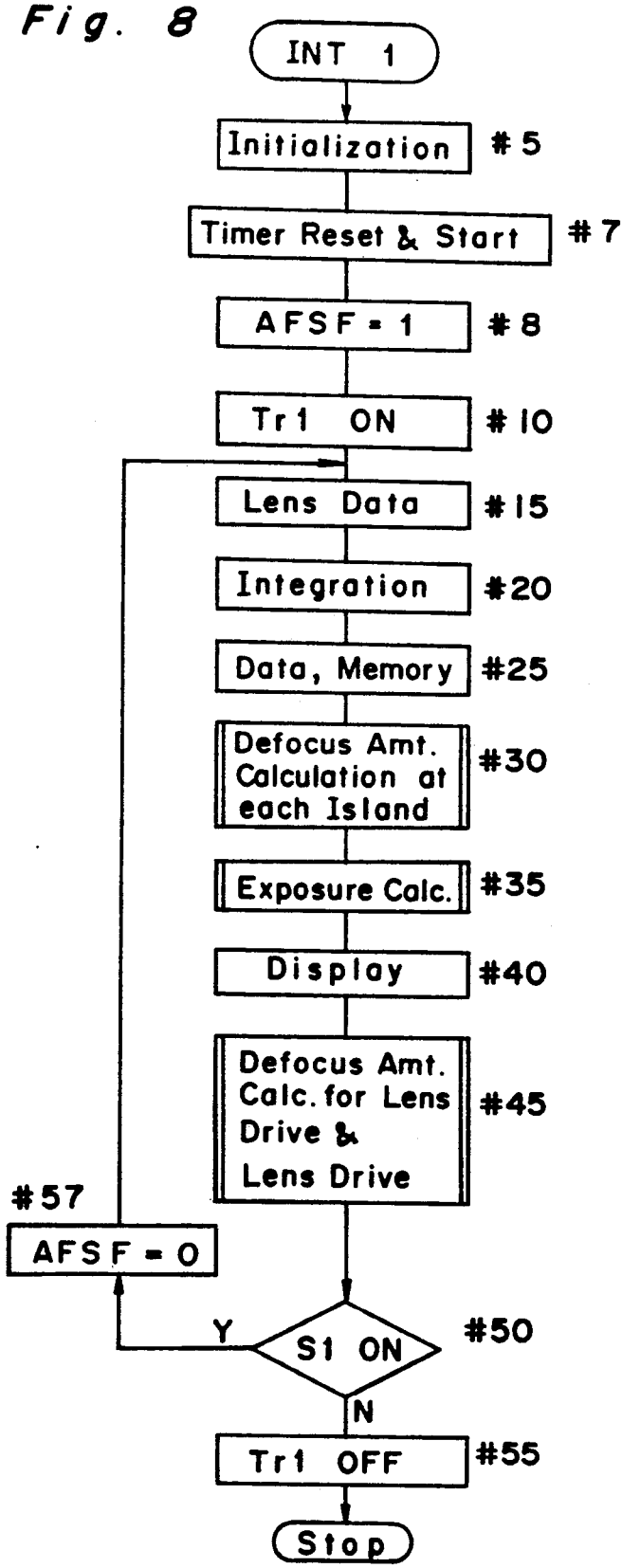
Figure 9:
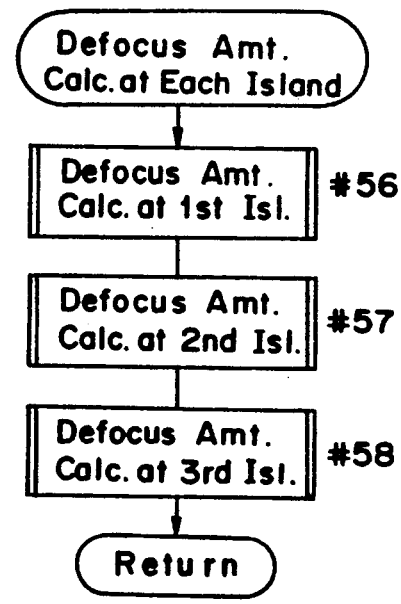
Figure 10:
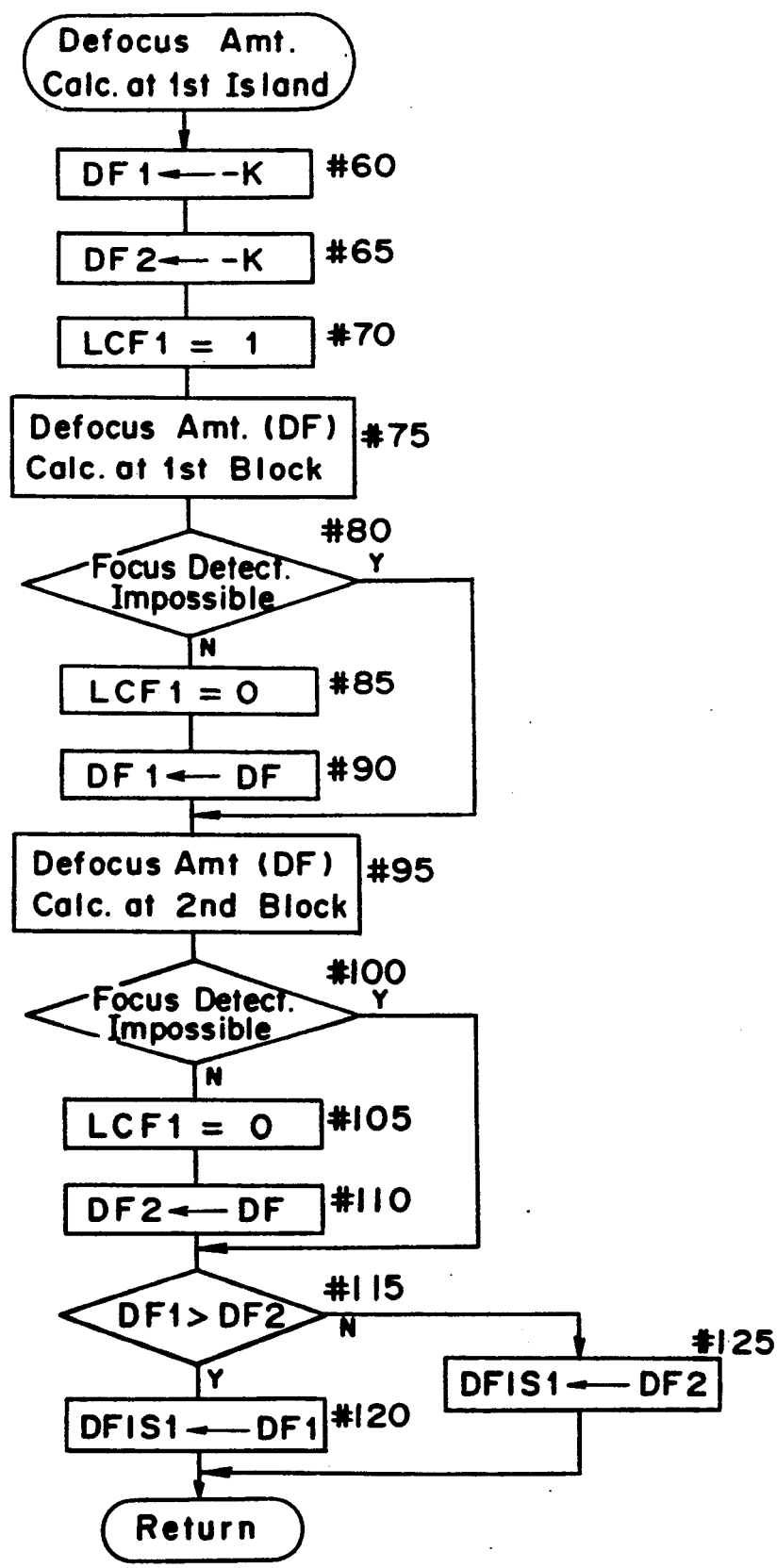
Figure 12:
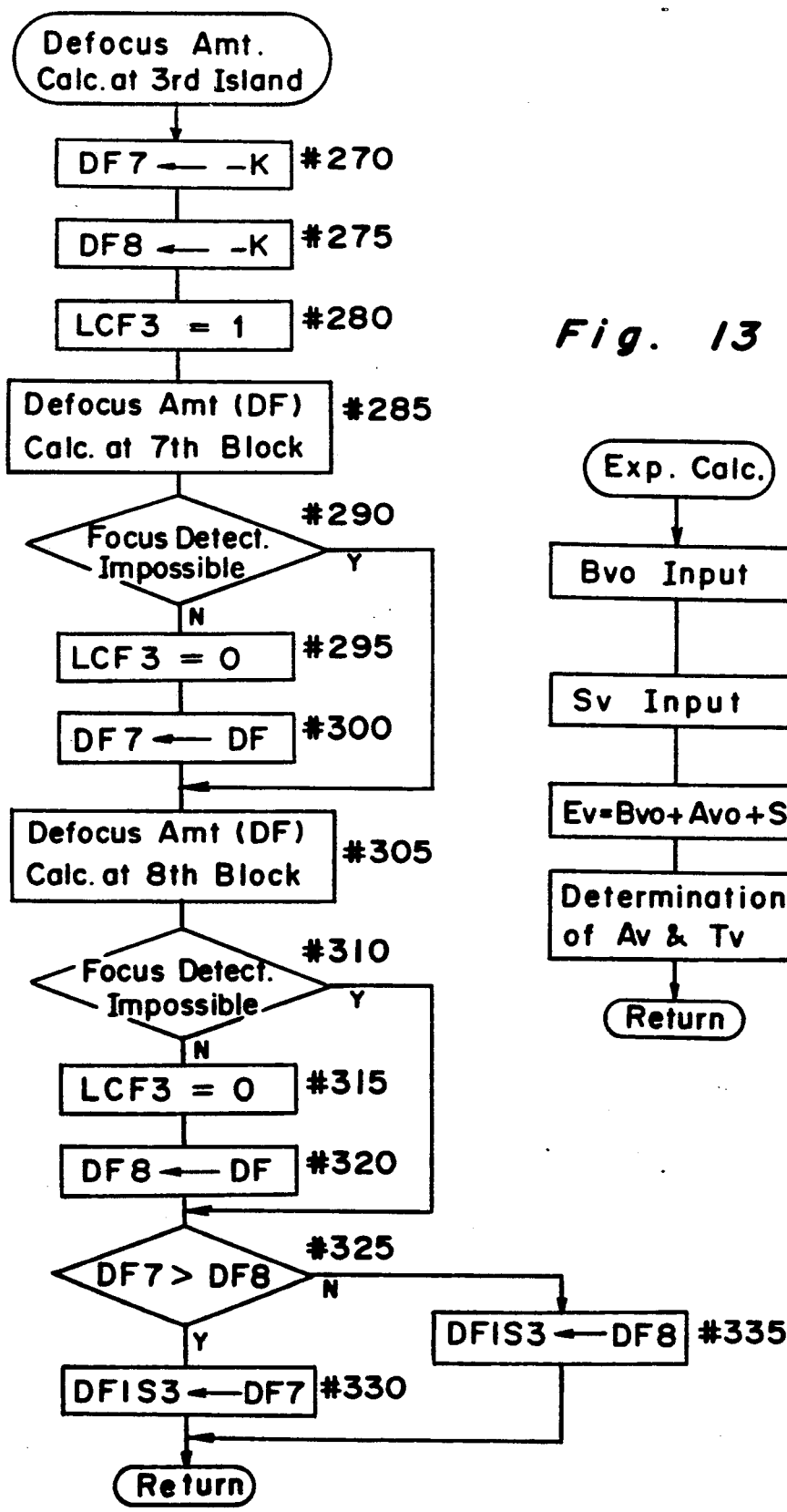

The subroutine executed at step #30 in the program flow of FIG. 8 is shown in detail in FIG. 9. As shown in FIG. 9, during the execution of the subroutine at step 30, the calculations of the defocus amounts at the first to third islands are sequentially performed at steps #56, #57 and #58, respectively. The details of the calculation of the defocus amount at each of the first to third islands are illustrated in FIG. 10, FIG. 11 and FIG. 12. Specifically, the program flow for the calculation of the defocus amount at the first island is shown in FIG. 10.

Referring first to FIG. 10, as hereinbefore discussed, the first island is divided into two blocks (the first and second blocks). Therefore, at successive steps #60 and #65, a predetermined value $-K$ is set to respective coefficients DF1 and DF2 necessary for the storage of the defocus amounts associated with the first and second blocks. This is a value representative of the front focus condition which does not occur in each blocks, and is used as a defocus amount in the event that the focus detection is impossible. At subsequent step #70, a flag LCF1 indicative of the incapability of focus detection at the first island (hereinafter referred to as a low contrast flag) is set. Then, at step #75, the detection of the focusing condition at the first block and the calculation of the defocus amount at the first block are performed, followed by step #80 at which a decision is made to determine if the focus detection is possible in reference to the result of calculation performed at the previous step #75. If the focus detection is impossible, the program flow proceeds to step #95, but if it is possible, the low contrast flag LCF1 is reset at step #85 and the defocus amount DF so obtained is rendered to be the defocus amount DF1 at the first block at subsequent step #90.

Thereafter, the detection of the focusing condition at the second block and the calculation of the defocus amount DF at the second block are performed at step #95, followed by step #100 at which a decision is made to determine if the focus detection is impossible in reference to the result of calculation performed at the previous step #100. If the result of decision at step #100 indicates that the focus detection is possible, the low contrast flag LCF1 of the first island is reset at step #105 and the defocus amount DF so obtained is rendered to be the defocus amount DF2 at the second block at step #110, followed by step #115. At step #115, the magnitude of the defocus amount (including the direction which may take negative and positive values in the front focus and rear focus conditions, respectively). The greater defocus amount, that is, the amount of defocus of the target object closer to the photographic camera, is rendered to be the defocus amount DFIS1 of the first island. More specifically, when the result of decision at step #115 indicates that the defocus amount DF1 at the first block is greater than the defocus amount DF2 at the second block, the defocus amount DF1 is rendered to be the defocus amount DFIS1 at the first island at step #120, but if it indicates that the defocus amount DF2 at the second block is greater than the defocus amount DF1 at the first block, the defocus amount DF2 is rendered to be the defocus amount DFIS1 of the first island at step #125. Thereafter, the microcomputer $\mu C$ returns to the program flow of FIG. 9.

After the execution of the program flow of FIG. 10, the microcomputer $\mu C$ executes the subroutine for the calculation of the defocus amount of the second island as shown in FIG. 11. Referring now to FIG. 11, during the program flow from step #130 to step #145, a predetermined value $-K$ is set to respective coefficients DF3 to DF6 necessary for the storage of the defocus amounts associated with the third to sixth blocks. Then, at step #150, a low contrast flag LCF2 indicative of the incapability of the focus detection at the second island is set, followed by the detection of the focusing condition in each of the third, fourth and fifth blocks (Steps #155 to #210), it being, however, to be noted that, since the details thereof are substantially similar to those of the first and second blocks, the description thereof will not be reiterated for the sake of brevity. At step #215, a decision is made to determine whether or not the focus detection at all of the third to fifth block is impossible, that is, whether or not the low contrast flag LC2 is set. If the low contrast flag LC2 is set, the program flow proceeds to step #217, but if it is not set, the program flow proceeds to step #240.

At step #240, the microcomputer μm determines the magnitude of the defocus amounts at the third to fifth blocks, the greatest defocus amount being rendered to be the defocus amount DFIS2 of the second island. See steps #240 to #265. Thereafter, the program flow returns to the routine of FIG. 9.

On the other hand, when the program flow proceeds to step #217 as a result of the decision at step #215, the microcomputer μC reforms the difference data, taken at intervals of 3, into difference data taken at intervals of 7 so as to enable the focus detection of the object of low frequency. More specifically, assuming that picture element data are expressed by l1, l2, . . . , ln, the difference data taken at the intervals of 3 are stored in the form of $dDn = l_1 - l_5, \ldots, l_5 - l_g, \ldots, l_n - l_{n+4}, \ldots$ Hence, the difference data taken at the intervals of 7 are $dDm' = l_1 - l_g, \ldots, l_m - l_{m+8}$ which can be obtained by taking the sum of the stored difference data dDn at the intervals of 3. In other words, the difference data taken at the intervals of 7 are $dDm' = (dD_1 + dD_5), \ldots, (dD_m + dD_{m+4}), \ldots = (l_1 - l_5 + l_5 l_g), \ldots, (l_{n-4} - l_n + l_n + l_n - l_{n+4}), \ldots = (l_1 - l_g), \ldots, (l_{n-4} - l_{n+4}), \ldots = (l_1 - l_g), \ldots, (l_m - l_{m+8}), \ldots$, wherein $n = m + 4$.

With the use of those new difference data dDm', the focus detection and the calculation of the defocus amount at the sixth block are carried out at step #220, followed by a decision at step #225 to determine if the focus detection is impossible. If the focus detection is possible, the low contrast flag LCF2 is reset at step #230 and the defocus amount DFIS2 at this block is rendered to be the defocus amount DFIS2 of the second island, followed by the return of the program flow to the routine of FIG. 9. Should the result of the decision at step #225 indicates that the focus detection is impossible, the program flow immediately returns to the flow of FIG. 9.

After the execution of step #57 of FIG. 9, the microcomputer μC executed, at step #58, the subroutine for the calculation of the defocus amount of the third island as shown in FIG. 12. Since the subroutine of FIG. 12 is substantially similar to the subroutine of FIG. 10 associated with the first island, the description thereof will not be reiterated for the sake of brevity. However, it is to be noted that the blocks at which the defocus amount is calculated is the seventh and eighth blocks and that, as variables for the storage of the defocus amount at each of these blocks, DF7 and DF8 are used; as a flag indicative of the incapability of the focus detection at the third island, LCF3 is used; and, as a variable for the storage of the defocus amount at the third island, DFIS3 is used in the subroutine of FIG. 12.

Figure 13:
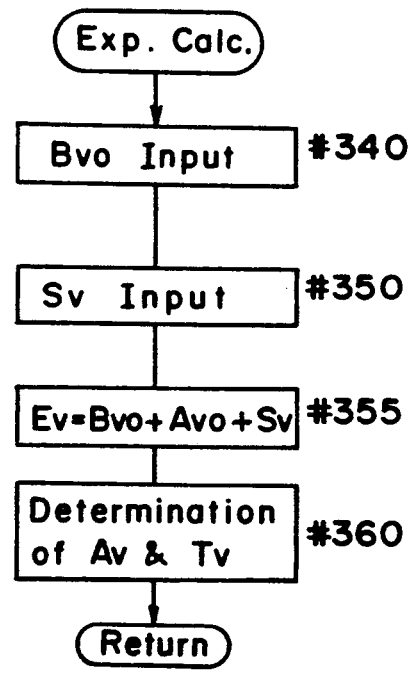

A subroutine of the exposure calculation carried out at step #35 shown in FIG. 8 is best shown in FIG. 13.

As shown therein, the microcomputer μC outputs to the luminance detecting circuit LMC a signal instructing to output the brightness data. Then, at step #340, the full-open brightness value Bvo which has passed through the lens is inputted. Similarly, the film sensitivity Sv is inputted from the film sensitivity read-out circuit ISO. At step #15 described hereinbefore, the full-open aperture value Avo has been inputted from the lens circuit LEC. Therefore, at subsequent step #355, based on the data so inputted, an exposure value Ev is calculated according to the equation of Ev = Bvo + Avo + Sv, followed by step #360 at which, according to a predetermined method of calculation, a control aperture value Av and a shutter speed Tv are determined. Thereafter, the program flow return to the flow of FIG. 8.

During the execution of the subroutine (shown in FIGS. 14 to 19) at step #45 of FIG. 8, the manner in which the object is distributed is divided into a plurality of patterns on the basis of the defocus amount determined at each of the islands, followed by the selection of an optimum algorithm to obtain an optimum defocus amount.

When the distribution of the object is to be considered, it is determined on the basis of the defocus amounts given at the two islands whether or not that objects in the two islands are of identical group or of different groups. Even though they are of identical group, a decision is also made to determine if they are closer together or spaced a slight distance from each other. Although the defocus amount (predetermined value a) used to determine if the target objects are of identical group or of different groups and if they are closer together or spaced a slight distance from each other is changed by a control F number of the lens, this is because the range over which the object can be focused varies depending on the depth of field, and has no concern with the pattern of the actual target object.

TABLE 1

| | Classification of Distribution in Two Islands | | |
|---|---|---|---|
| | Objects of Identical Group | | Objects of Different Groups |
| Lens F-number | Close together | Spaced | |
| F2.8 or greater | Within 100 μm | 101–400 μm | 401 μm or more |
| F2.8 or less | Within 200 μm | 201–400 μm | |

TABLE 2

| Photo-taking Magnification | Focal Length f | | Basic Idea of Algorithm for Distance Measurement |
|---|---|---|---|
| | f ≧ 50 mm | f < 50 mm | |
| High Magnification Area | 1/15 or more | 1/15 or more | Center of Distance Measuring Area is Weighted. |
| Medium Magnification Area | 1/15–1/100 | 1/15 or less | Center Distance Distribution is Weighted. |
| Low Magnification Area | 1/100 or less | — | Close Side of Distance Distribution is Weighted. |

TABLE 3

| Type of Lens | | Amt. of Lens Moved (DFs) | Coverage of Image Magnification |
|---|---|---|---|
| Macro- | f = 50 mm | 6 mm | −0.4 times |
| lens | f = 100 mm | 6 mm | −0.2 times |
| 200 mm ≦ f ≦ 300 mm | | 6 mm | −1/15 times |
| 300 mm < f ≦ 600 mm | | 15 mm | −1/20 times |

TABLE 3-continued

| Type of Lens | Amt. of Lens Moved (DFs) | Coverage of Image Magnification |
|---|---|---|
| 600 mm < f | 25 mm | −1/30 times |

When the focus detection of the object at the second island is possible, the photo-taking magnification at the second island is calculated on the basis of the defocus amount at this island, the data of the focal length of the lens and the data of the distance to the object and, depending on this, the algorithm for the determination of the defocus amount is varied. Basically, when the photo-taking magnification is great, it is assumed that a main object to be photographed is necessarily aligned with a center of the field of view and priority is given to the second island. On the other hand, when the photo-taking magnification is medium, it is assumed that, because the camera is used to take pictures of a plurality of persons, deviation in distribution of the distance is not so great and, therefore, priority is given to a center of the distribution of the distance. When the photo-taking magnification is small, it is assumed that, because the camera is used to take pictures containing background scenes, the deviation in distribution of the distance is great. In such case, since the main object is generally located close to the camera, priority is given to a short distance side of the distribution of the distance.

Standard values for the determination of the photo-taking magnifications and the basic idea of algorithm are tabulated in Table 2. In the illustrated instance, when the focal length is shorter than 50 mm, and when the photo-taking magnification is less than 1/15, the algorithm for the distance measurement is weighted on the center of the distribution of distance. This is because, the shorter the focal length, the greater the depth of field, and, therefore, when the center of the distribution of distance is focused, the object detected by the remaining islands can be sufficiently covered Table 2 speaks of this fact although the details may vary as will subsequently be described.

Figure 14:
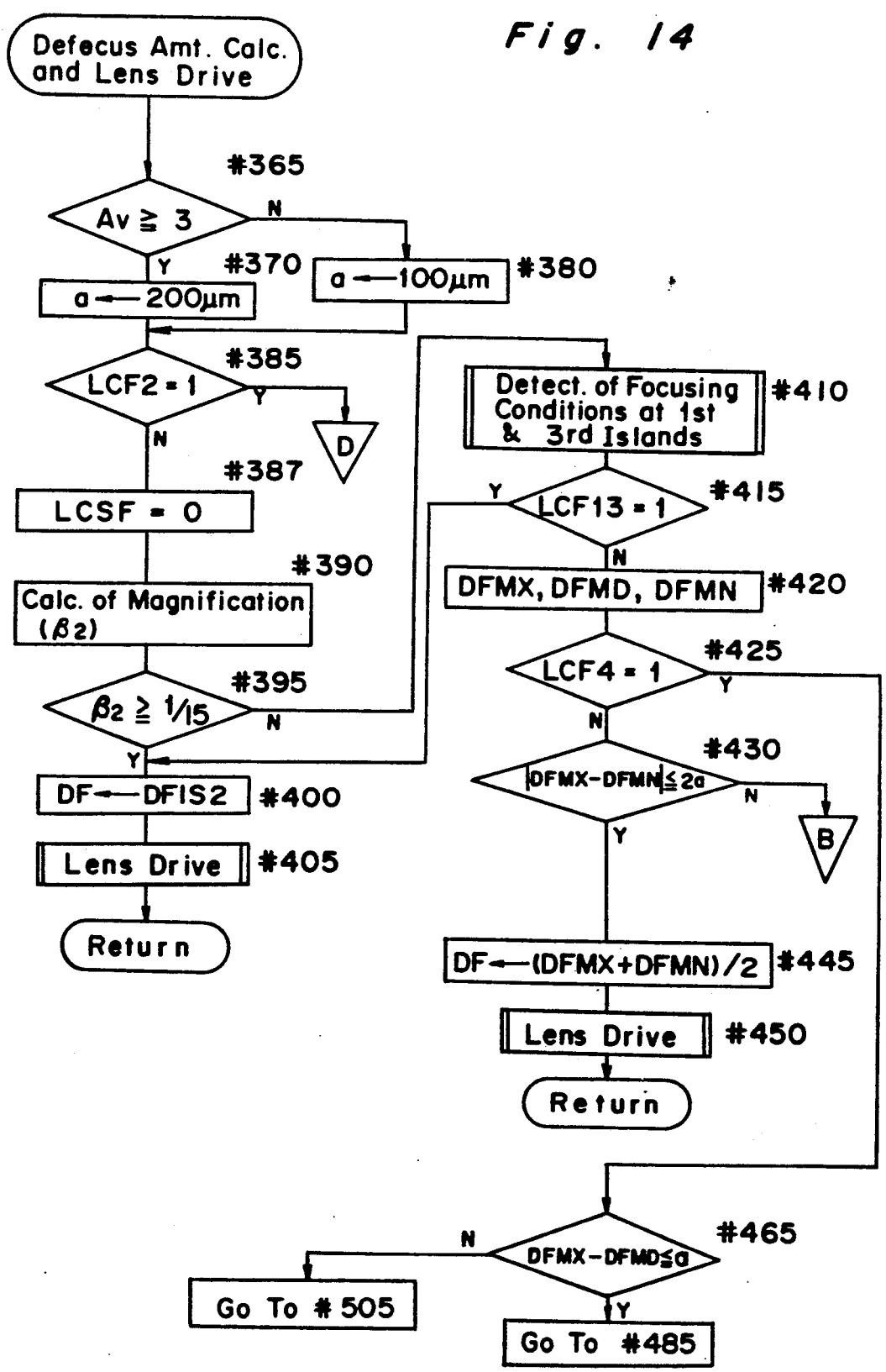

A flowchart necessitated to execute the above described contents, that is, the subroutine executed at step #45 shown in FIG. 8, is illustrated in FIG. 14, reference to which will now be made. At the outset, the microcomputer $\mu C$ makes a decision at step #365 to determine if the control aperture value Av is 3 or greater (F-number being 2.8 or greater). If the control aperture value Av is 3 or greater, the defocus range (predetermined value a) which can be regarded as a proximity is rendered to be 200 micrometers at step #370, but if it is smaller than 3, the defocus range is rendered to be 100 micrometers at step #380, followed by step #385. At step #385, a decision is made to determine if the second island is incapable of carrying out the focus detection in reference to whether or not the low contrast flag LCF2 is set. Should the result of decision at step #385 indicates that the focus detection is impossible (i.e., LCF2=1), the program flow proceeds to step #620 as will be described later. On the other hand, should the result of decision at step #385 indicates that the focus detection is possible (i.e., LCF2=0), in order to release the low contrast scanning, the flag LCSF indicative of the low contrast scanning is reset at step #387 and, subsequently, the photo-taking magnification $\beta_2$ of the target object existing at the second island is calculated at step #390 in the following manner.

Assuming that the camera-to-object distance and the focal length are respectively expressed by x and f, the photo-taking magnification $\beta_2$ can be expressed as follows.

$$\beta_2 = f/x$$

Since the focal length f is inputted from the lens, the camera-to-object distance x must be known in order to know the photo-taking magnification $\beta_2$. The camera-to-object distance x can be expressed as follows if the defocus amount of the lens from the infinity position to the position of the object is expressed by DFx.

$$x = f^2/DFx$$

It is however to be noted that the foregoing equation is an approximate equation since the lens is not composed of a single ideal thin lens and has a principle point at front and rear, which point varies with change in focal length. On the other hand, the defocus amount DFo of the lens from the infinity position to the current position is stored in the counter for indicating the current position of the lens in terms of the amount (the number) of rotation of the motor, the relationship of which is as follows.

$$N = k \cdot DFo$$

It is to be noted that the coefficient k is inputted from the lens. From the foregoing equation, the defocus amount of the lens from the infinity position to the current position is expressed by DFo = N/k. The defocus amount DF of the lens from the current position to the position of the target object can be obtained by the focus detection and, therefore, the defocus amount of the lens from the infinity position to the position of the object is expressed by DFx = DFo + DF. Thus, the camera-to-object distance x and the photo-taking magnification can be calculated as follows.

$$x = f^2/DFx = f^2/(N/k + DF)$$

$$\beta_2 = f/x = (N/k + DF)/f, \text{ or}$$

$$\beta_2 = (N + \Delta N)/F \cdot k$$

wherein $\Delta N$ represents the amount of drive of the lens from the current position to the position of the object and is equal to the product of the defocus amount DF multiplied by the coefficient k, that is, $\Delta N = DF \cdot k$.

Then, at step #395, a decision is made to determine if the photo-taking magnification so calculated is greater than or equal to 1/15. If the photo-taking magnification is greater than or equal to 1/15, the defocus amount DFIS2 obtained at the second island is rendered to be the defocus amount DF for the drive of the lens at step #400, followed by the execution of a subroutine for the actual drive of the lens at step #405, which subroutine will be described later.

Figure 18:
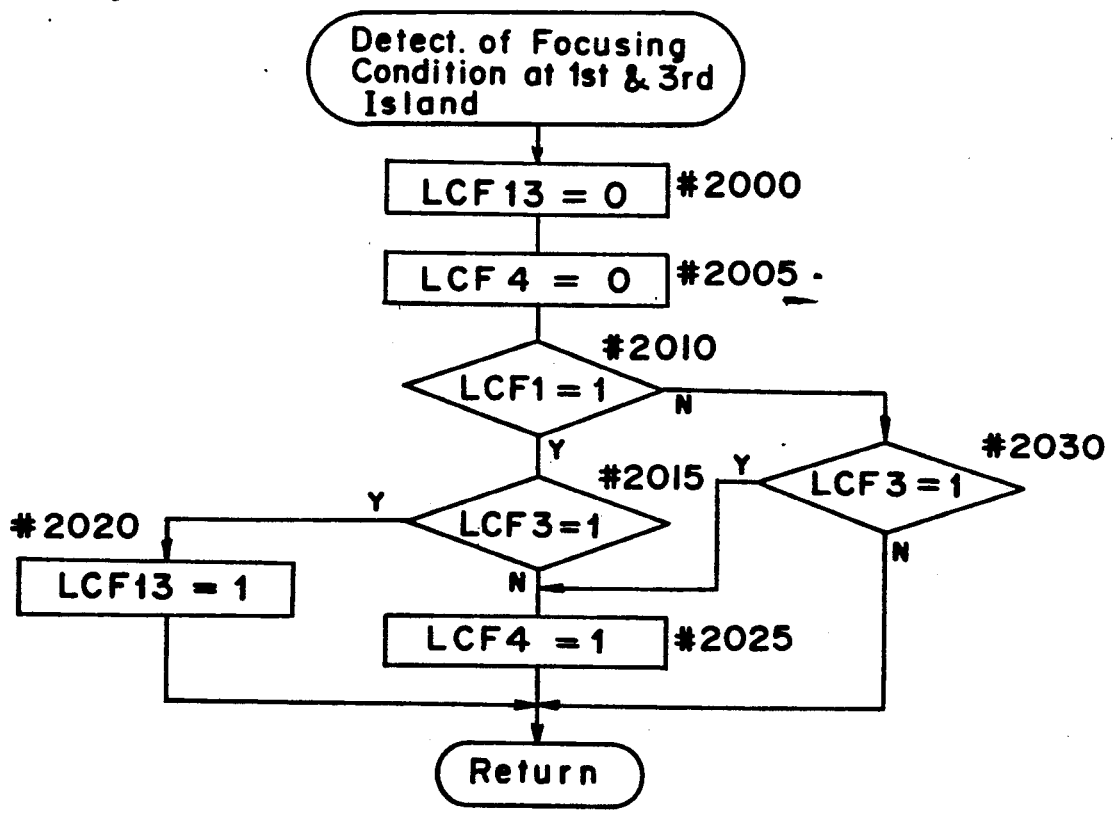

If the photo-taking magnification $\beta_2$ is less than 1/15 as determined at step #395, the focusing condition at each of the first and third islands is detected at step #410. The subroutine for the detection of the focusing condition at each of the first and second islands which is performed at step #410 is illustrated in FIG. 18. Referring to FIG. 18, at step #2000 and then at step #2005, a flag LCF13 indicating that the focus detection at both of the first and third islands is not possible and a flag LCF4 indicating that the focus detection at only one of the first and third islands is not possible are successively reset. Thereafter, a decision is made to determine if the flags LCF1 and LCF3 indicating that the focus detection is not possible at the first and third islands are set (Steps #2010 and #2015). If both of the flags LCF1 and LCF3 are set, the flag LCF13 is set at step #2020, but if only one of the flags is set, the flag LCF4 is set at #2025 after the decision step at #2030. On the other hand, if none of the flags is set, the program flow returns without both of the flags LCF13 and LCF4 being set (steps #2010 and #2030).

Referring back to FIG. 14, subsequent to the execution of the subroutine of FIG. 18, and at step #415, a decision is made to determine if the flag LCF13 indicating that the focus detection at neither the first nor third islands is possible. If the flag LCF13 is set, it means that the focus detection is carried out only at the second island and, therefore, the program flow proceeds to step #400 so that the lens can be driven on the basis of the defocus amount DFIS2 of the second island. On the other hand, if the flag LCF13 is not set, the maximum defocus amount DFMX of the object which is closest to the camera, the minimum defocus amount DFMD of the object which is furthest from the camera and the defocus amount DFMD which is an intermediate value between the maximum and minimum defocus amounts are determined at step #420. Then, at step #425, a decision is made to determine if the flag LCF4 indicating that the focus detection is not possible at only one of the first and third islands is set. If this flag LCF4 is set, that is, when the focus detection at only one of the first and third islands is not possible, the program flow proceeds to step #465 as will be detailed later. On the other hand, if the flag LCF4 is not set, that is, when the focus detection is possible at all of the first and third islands, the program flow proceeds to step #430.

Hereinafter, the algorithm for the determination of the defocus amount appropriate to such particular distance distributions which are shown in FIGS. 25(a) to 25(h) for the purpose of illustration of the present invention. It is to be noted that, in FIGS. 25(a) to 25(h), reference characters (1), (2) and (3) represents objects detected at the first, second and third islands, respectively, and the object (1) may be reversed in position with the object (3).

(a): When the deviation among the three defocus amounts is within 2a. (See FIG. 25(a)).

When the deviation in defocus amount among the three islands is within 2a (wherein a represents a predetermined value), an average value between the maximum defocus amount DFMX and the minimum defocus amount DFMN is used as the defocus amount DF to drive the lens on the basis thereof (step #430 to step #450). This is because, irrespective of the photo-taking magnification, within this range of defocus amount, although somewhat variable depending on the aperture value and the focal length, both of the objects represented by the maximum defocus amount DFMX and the minimum defocus amount DFMN, respectively, can be substantially focused by taking the average value between the maximum defocus amount DFMX and the minimum defocus amount DFMN. At step #430, if the deviation in defocus amount among the three islands is not within 2a, the program flow proceeds to step #457 shown in FIG. 15.

(b): When the deviation among the three defocus amounts is within a. (See FIG. 25(b)).

At step #425, if the flag LCF4 is set, the focus detection at one of the first and third islands is rendered not possible while the program flow proceeds to step #465 at which a decision is made to determine if the difference between the defocus amounts DFMX and DFMN at the two islands which can detect the focusing conditions is within the predetermined value a. If it is within the predetermined value a, step #485 takes place to determine the average value between these defocus amounts DFMX and DFMN so that the lens can be driven on this at step #490. In this case, the defocus amount of the island which cannot perform the focus detection is −K which represents the minimum defocus amount DFMN. Unless the object is not such as above, the program flow proceeds to step #505.

(c): When only the furthest target object is distant. (See FIG. 25(c)).

When a result of decision at step #475 indicates that the difference between the defocus amount DFMX of the closest object and the defocus amount DFMD of the object at the intermediate distance is within the predetermined value a, the program flow proceeds to step #485 at which, as the defocus amount DF, an average value between the defocus amount DFMX of the closest object and the defocus amount DFMD of the object at the intermediate distance is taken so that the lens can be driven on the basis of the average value at subsequent step #405. Thereafter, the program flow returns. The scene of the objects may be such that, for example, although the main object including plural persons is located at a closer position, only one of the island views the object because they are biased towards one portion of the field of view or because a central portion of the field of view is vacant.

(d): When the object in the central portion of the field of view is closest. (See FIG. 25(d)).

In the case where the object is not such as in the cases (a), (b) and (c), and when the object associated with the second island is closest to the camera, the lens can be driven on the basis of the defocus amount DFIS2 of the second island. In the illustrated example, at step #505, a decision is made to determine if the defocus amount DFIS2 of the second island is maximum. If it is maximum, the program flow proceeds to step #400 to drive the lens on the basis of the defocus amount DFIS2 of the second island.

Figure 25A:
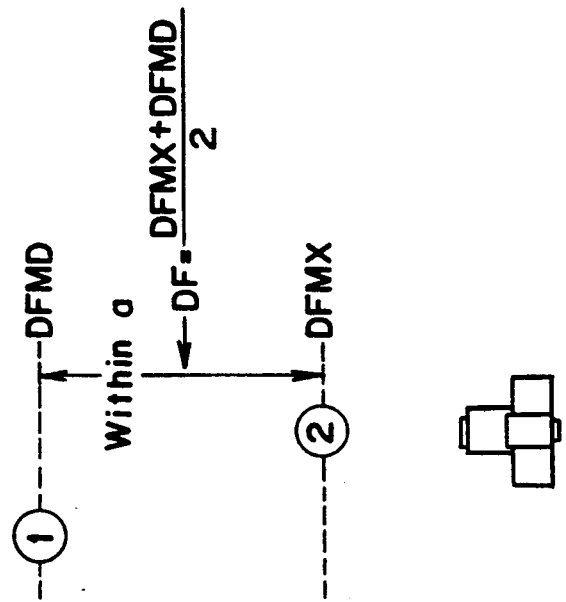
Figure 25B:
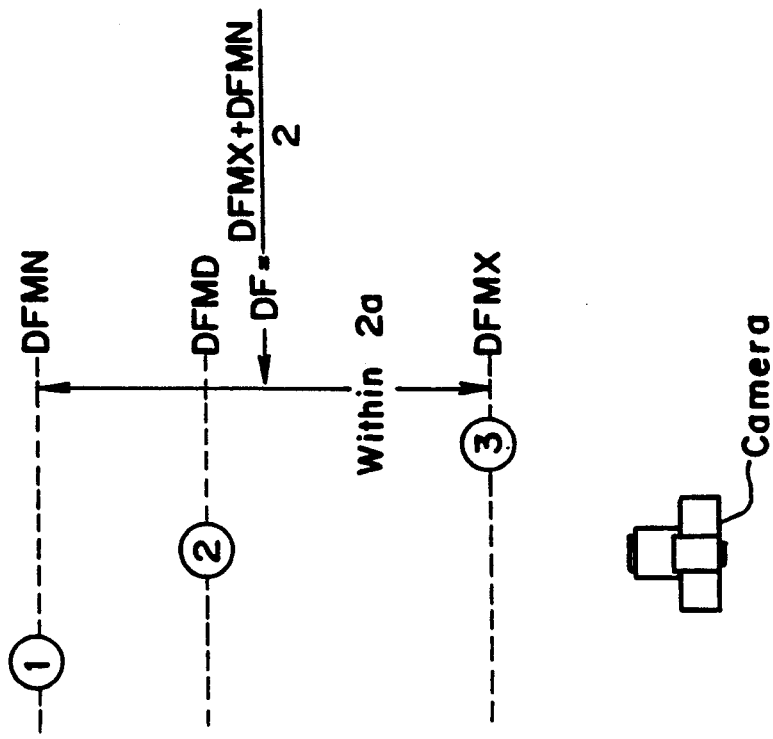
Figure 25D:
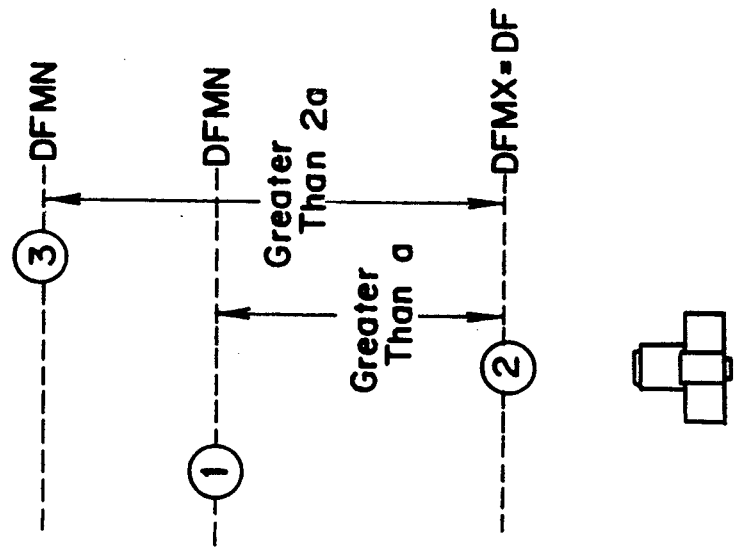
Figure 25C:
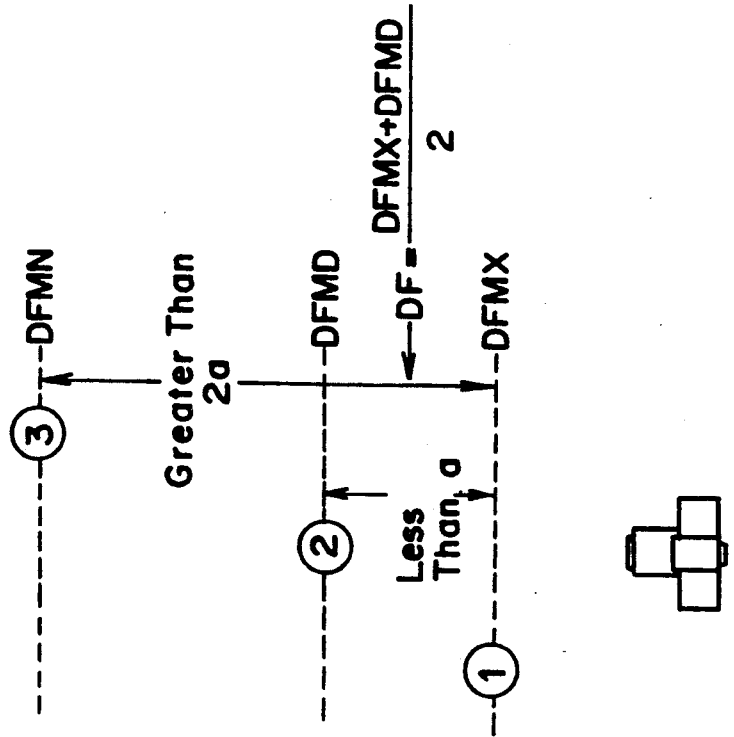
Figure 25F:
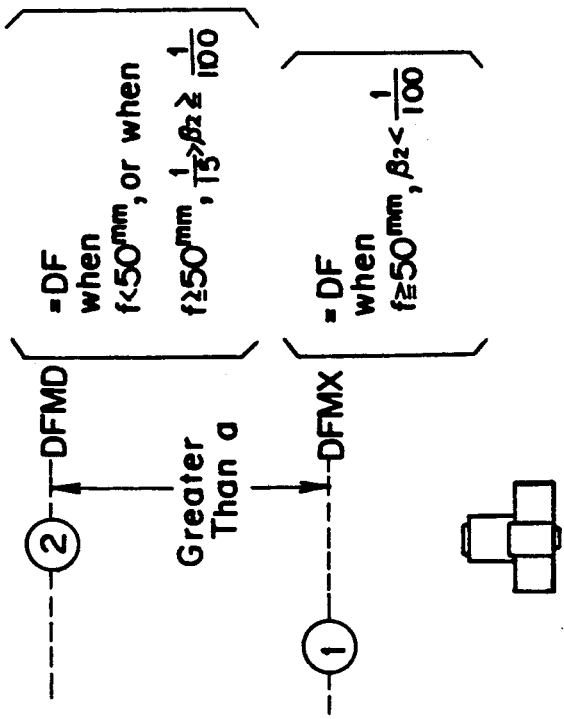
Figure 25E:
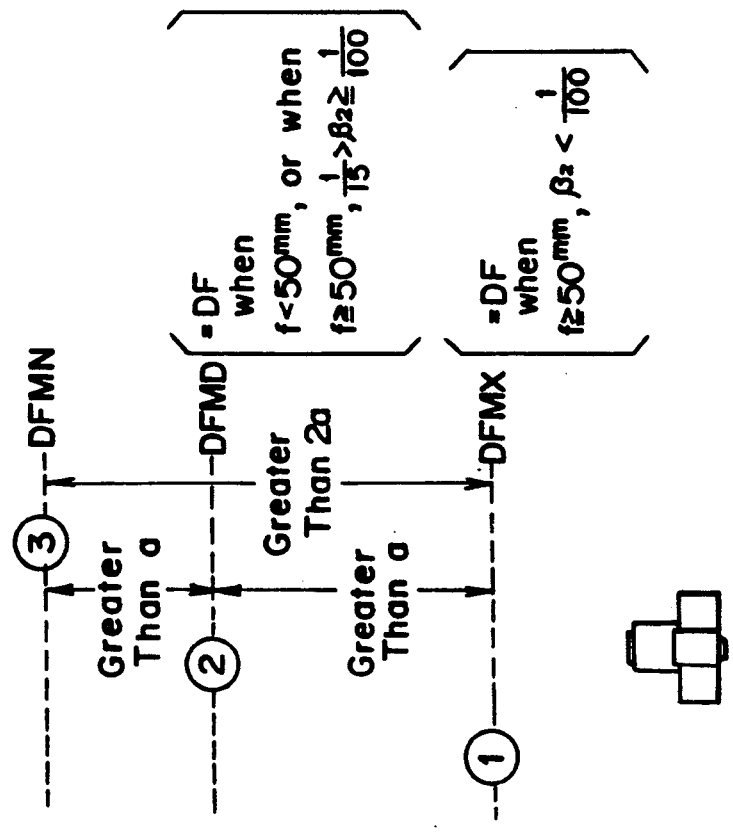

(e) When the focus detection is possible at all of the islands, the object associated with the second island is located at a center in the distance distribution and no object exist in the vicinity of such object (See FIG. 25(e)), and (f) when the focus detection is not possible at only one of the first and third islands, the object associated with the second island is remote from the camera and the object associated with the island which can perform the focus detection does not exist in the vicinity of the object associated with the second island (See FIG. 25(f)), the algorithm for the determination of the defocus amount differs as follows depending on the focal length f of the lens and the photo-taking magnification $\beta_2$ at the center of the field of view.

(i) When the focal length of the lens is short, for example, shorter than 50 mm, priority is given to the object on the second island regardless of the photo-taking magnification $\beta_2$. One of the reasons therefore is the high probability that a main object exists at the second island (that is, at the center of the field of view). Because of the great depth of field in the lens of short focal length, even if there are two objects, one being far from the other, in the same island, or even if the object exists at another island, the objects can be accurately focused.

(ii) When the focal length of the lens is long, for example, greater than or equal to 50 mm, after the photo-taking magnification $\beta_2$ has been calculated, (A) priority is given to the object on the second island in view of the fact that, as it is thought that a picture with persons as a main object is desired to be taken, the image is relatively large and exist in high probability at the center of the field of view, or (B) priority is given to the object on the island from which the current defocus amount DFMX has been obtained in view of the fact that, as a picture of persons with background scene is desired to be taken, the main object is often located close to the camera.

To describe the foregoing situations in terms of a flowchart, at step #507, the determination of which only one of the first and third island is unable to achieve the focus detection is carried out in terms of whether or not the flag LCF4 is set. If the flag LCF4 is set, it is determined (at steps #475 and #505) that the difference between the maximum defocus amount DFMX and the defocus amount DFIS2 of the second island exceeds the predetermined value a and, therefore, the object on the second island is further than the object on the other islands and the other object is not close with the consequence that the program flow proceeds to step #520.

On the other hand, if the flag LCF4 is not set, the focus detection at all of the islands is rendered possible and, at step #515, a decision is made to determine if the difference between the defocus amount DFIS2 of the second island and the minimum defocus amount DFMN exceeds the predetermined value a. If this difference exceeds the predetermined value a, it means that the object on the second island is located central in the distance distribution and the objects forwards and rearwards thereof are not located in the vicinity of the object on the second island and, therefore, the program flow proceeds to step #520. On the other hand, if it does not exceeds the predetermined value a, the program flow proceeds to step #555.

At step #520, a decision is made to determine if the focal length f of the lens is greater than or equal to 50 mm, and at step #525, a decision is made to determine if the photo-taking magnification $\beta_2$ is greater than or equal to 1/100. Should the focal length f be not greater than 50 mm, or the photo-taking magnification $\beta_2$ is greater than 1/100, the program flow proceeds to step #400 so that the lens can be driven on the basis of the defocus amount DFIS2 of the second island. On the other hand, if the focal length f of the lens is greater than or equal to 50 mm and the photo-taking magnification is less than 1/100, the program flow proceeds to step #530 to render the maximum defocus amount DFMX to be the defocus amount DF for the lens drive at step #530 and the lens can be driven at steps #535 on the basis of this defocus amount. Thereafter, the program flow returns.

With respect to the distance distribution of the object, it is assumed that (g) the object on the first or third island (for example, the object (1)) is closest and the object (2) on the second island is not in the vicinity of the object (1) at the same time, that the object (3) on the remaining island other than the second island and the island on which the object (1) is located is located in the vicinity of the object (2) o the second island. See FIG. 25(g).

For the defocus amount appropriate under this situation, the average value between the defocus amount DFIS2 of the second island and the defocus amount in the vicinity thereof is used when the focal length f of the lens is shorter than 50 mm or when the photo-taking magnification $\beta_2$ is greater than or equal to 1/100 and less than 1/15 so that the average value can be used as the defocus amount DF for the lens drive. The reason therefore is that, where the photo-taking magnification $\beta_2$ is of a relatively large range (1/15 > $\beta_2 \geq$ 1/100), pictures of persons are frequently taken and there may be a case in which the object often comes to the center of the field of view (the second island) or plural persons are photographed and, in such case, the object is located in the vicinity of the center of the field of view (the second island). And, it may be thought that the object such as, for example, advertising panels or desks, other than the object (the object (1) in FIG. 25(g)) referred to above is located right close to the camera and it might be the object which gives the maximum defocus amount (the closest distance), and this is neglected as an improper defocus amount for the lens drive. In the case of the photography with a lens whose focal length is short (f < 50 mm), it is thought that scenic pictures covering the whole scene are often photographed and, therefore, the object furthest from the camera including the second island and the object in the neighbor thereof are focused. On the other hand, when the focal length f is greater than or equal to 50 mm, and the photo-taking magnification $\beta_2$ of the second island is less than 1/100, attempt is made to focus on the closest object. In general, with the lens of long focal length, the main object (particular objects such as, for example, persons or animals) are often photographed and, in such case, the main object is generally located close to the camera, and other objects are regarded as backgrounds.

Figure 15:
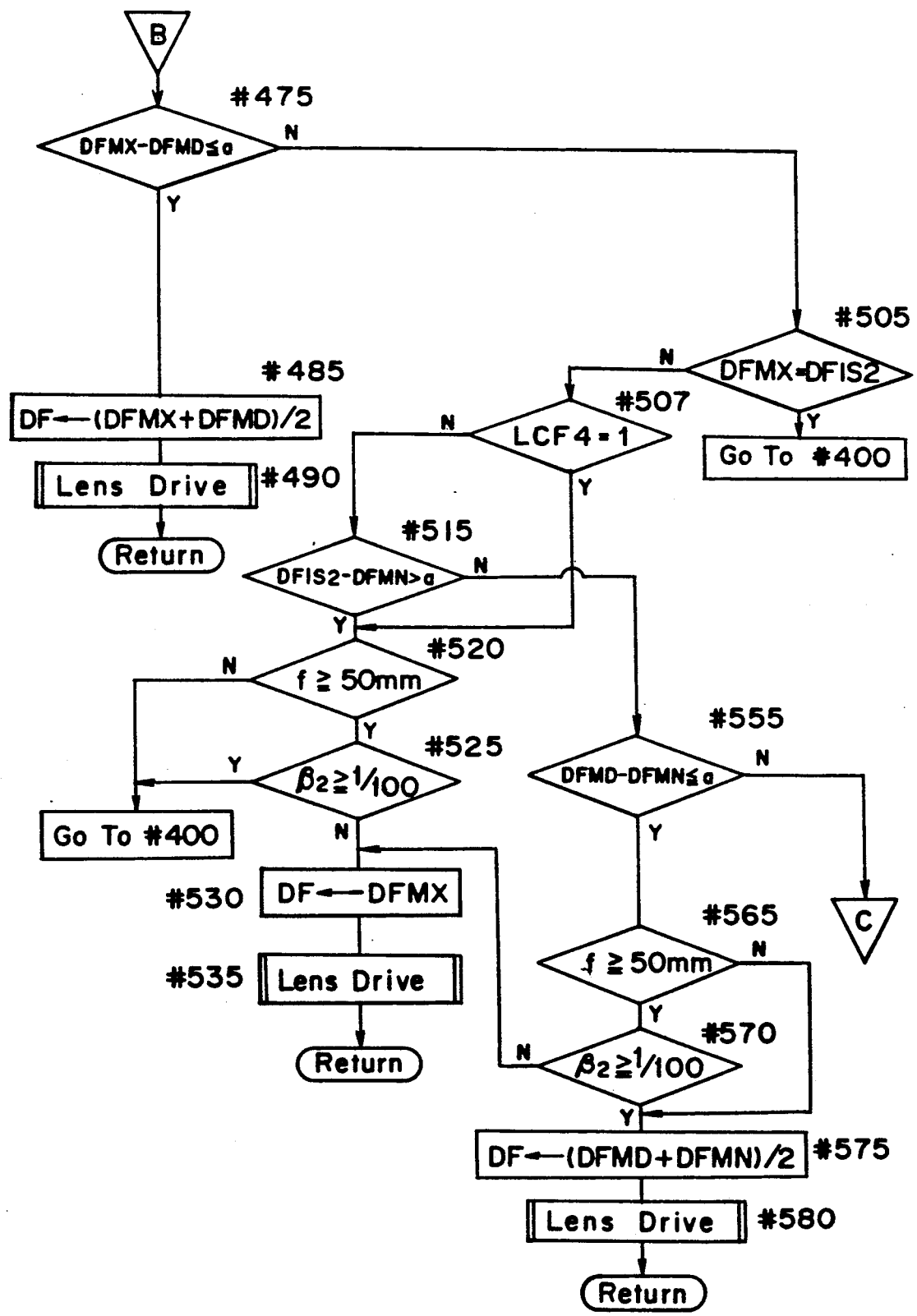

This will be described with reference to the flowchart of FIG. 15. The case in which the difference between the maximum defocus amount DFMX and the intermediate defocus amount DFMD exceeds the predetermined value a (step #475), the defocus amount DFIS2 of the second island is not the maximum defocus amount DFMX (step #505), and the difference between the intermediate defocus amount DFMD and the minimum defocus amount DFMN is within the predetermined value a (step #555) applies to the above discussed distance distribution of the object and, therefore, the program flow proceeds to step #565. Other than this, the program flow exceeds to step #590 shown in FIG. 16.

At step #565, a decision is made to determine if the focal length f of the lens is greater than or equal to 50 mm. If it is less than 50 mm, the program flow proceeds to step #575, followed by step #575 at which the average value between the intermediate defocus amount DFMD and the minimum defocus amount DFMN is rendered to be the defocus amount for the lens drive and the lens is driven at step #580 on the basis thereof. Thereafter, the program flow returns. On the other hand, if the focal length is greater than or equal to 50 mm, a decision is made at step #570 to determine if the photo-taking magnification $\beta_2$ of the second island is greater than or equal to 1/100. If it is greater than or equal to 1/100, the program flow proceeds to step #575 to effect the above described control. On the other hand, if it is less than 1/100, the program flow proceeds to step #530 to effect a control necessary to focus on the maximum defocus amount DFMX.

Finally, the case (h) in which the objects on the three islands are not located in the neighbor with respect to each other and the object on the second island is distant (FIG. 25(h)) is taken into consideration.

In this case, with the short focal length (f < 50 mm), the intermediate defocus amount DFMD is taken as the defocus amount DF for the lens drive and, the objects exhibiting the maximum and minimum defocus amounts DFMX and DFMN on respective sides of the intermediate defocus amount DFMD can be focused by the depth of field. With the long focal length (f ≦ 50 mm), when the photo-taking magnification $\beta_2$ of the second island is within the range of 1/15 to 1/100 (1/100 ≦ $\beta_2$ ≦ 1/15), photo-taking is directed to the main object (not the background) and, in view of the fact that there are many object which gives the intermediate defocus amount DFMD, this intermediate defocus amount DFMD is taken as the defocus amount DF for the lens drive. Where the photo-taking magnification $\beta_2$ is less than 1/100, the object of the second island is not the main object, but the background, and the intermediate photo-taking magnification $\beta_{MD}$ is calculated. If the intermediate photo-taking magnification so calculated is less than 1/100, the object giving the intermediate defocus amount DFMD is not the main object after all and the defocus amount DFMX at which the closest object is located is used as the defocus amount DF for the lens drive. On the other hand, if the intermediate photo-taking magnification $\beta_{MD}$ is greater than or equal to 1/00, there is many case in which the main object is often located in the intermediate defocus amount DFMD and, therefore, this intermediate defocus amount DFMD is taken as the defocus amount DF for the lens drive.

Figure 16:
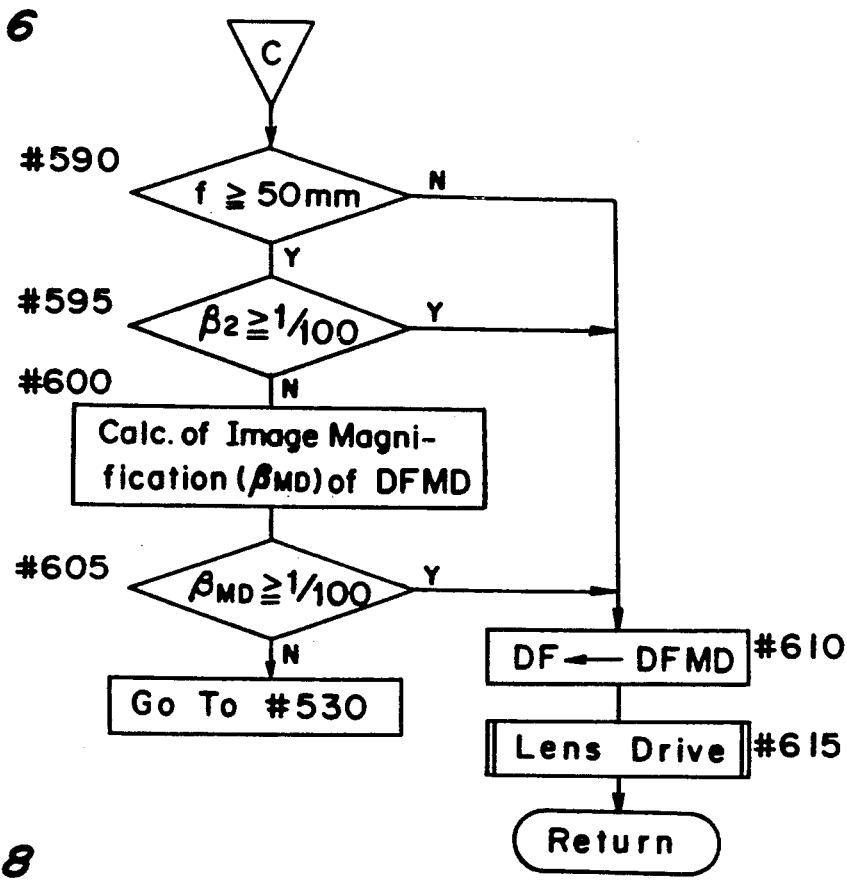

Referring now to FIG. 16 illustrating this situation, a decision to determine if the lens focal length f is greater than or equal to 50 mm and a decision to determine if the photo-taking magnification $\beta_2$ of the second island is greater than or equal to 1/100 are successively performed at respective steps #590 and #595. Where the lens focal length f is less than 50 mm and the photo-taking magnification is greater than or equal to 1/100, the program flow proceeds to step #610 at which the intermediate defocus amount DFMD is substituted for the defocus amount DF for the lens drive and the lens is then driven at step #615, followed by the return of the program flow. On the other hand, where the focal length is greater than or equal to 50 mm and the photo-taking magnification $\beta_2$ is less than 1/100, the photo-taking magnification $\beta_{MD}$ of the intermediate defocus amount DFMD is calculated according to the equation of $\beta_{MD} = (N/k + DFMD)/f$ at step #600 and a decision is then made at step #606 to determine if the intermediate photo-taking magnification $\beta_{MD}$ is greater than or equal to 1/100 at step #605. Where the intermediate photo-taking magnification $\beta_{MD}$ is greater than or equal to 1/100, the program flow proceeds to step #615 through step #610 so that the lens can be driven on the basis of the intermediate defocus amount DFMD. If the photo-taking magnification $\beta_{MD}$ is less than 1/100, the program flow proceeds to step #530 at which the lens can be driven on the basis of the maximum defocus amount DFMX.

The determination of the defocus amount for the lens driven in reference to the distribution of the objects and the photo-taking magnification is based on the statistical analysis for which a number of photographic pictures were taken.

The algorithm to be used when the second island is unable to perform the focus detection will now be described. In the flowchart, the program flow proceeds from step #385 shown in FIG. 14 to step #620 shown in FIG. 17. At step #620, the subroutine for the focus detection at the first and third islands, as shown in FIG. 18, is executed to determine the focusing condition thereof, followed by step #625 at which a decision is made to determine if at both of the first and second islands it is impossible to detect focusing condition. If at both of the first and second islands it is impossible to detect focusing condition, that is, the flag LCF13 is set to 1, the program flow proceeds to step #692.

Where the flag LCF13 is not set, at step #630 the absolute values |DFIS1| and |DFIS3| of the respective defocus amounts of the first and third islands are calculated and, thereafter, at step #635, the smaller (the defocus amount MINDF) one of these two absolute values, that is, the defocus amount of the object which is closer to the focusing position of the current lens and which can be focused, is determined. Subsequently, a decision is made at step #640 to determine if the absolute value of the difference between the defocus amount MINDF and the previous defocus amount DF is within 2a, that is, to determine if the object exists in the vicinity of the previous defocus amount. If it exists, it means that the main object is in the first or third island in high probability and, therefore, the defocus amount DF is rendered to be the defocus amount MINDF at step #645 and, at step #647 at which the flag LCSF indicative of the low contrast condition is reset, followed by step #650. Where the defocus amount MINDF exceeds 2a, the program flow proceeds to step #670 at which a subroutine for the determination of whether a forward scan is to be performed. The forward scan is to catch the object existing in the second island while the lens held at the most rearwardly moved position is moved to a predetermined position (variable depending on the focal length and the type of the lens) in search for the true focus position thereby to extend the focus detecting range in the optical direction and is useful to increase the reliability of the multi-area focus detection in which the focus detection is carried out in a relatively wide photo-taking range.

Figure 21:
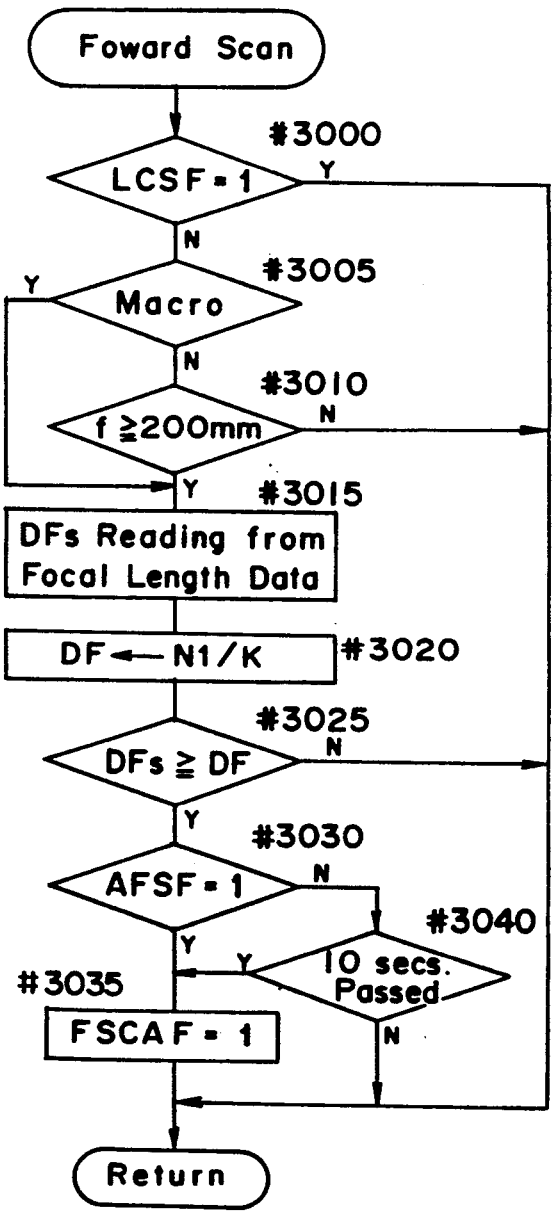

A subroutine for the determination of the forward scan is illustrated in FIG. 21. Referring now to FIG. 21, the microcomputer $\mu C$ determines whether or not the flag LCSF is set, the flag LCSF indicates the low contrast scan is carried out, which is carried out for making a search for the focus detectable range while the lens is driven when the focus detection is not possible. Where the flag LCSF is set, it means that by the low contrast scan the focus detectable range (the first or third island) could be detected and, therefore, the program flow returns without the forward scan being determined at step #3000. On the other hand, where the flag LCSF is not set, an operation to determine whether or not the forward scan is to be performed is carried out. While the forward scan is for the purpose of extending the focus detecting range in the optical direction, no forward scan is performed in the case of the lens of not long focal length (less than 200 mm) excluding a macro lens because, even when the lens is at the rearmost position, the relatively large detecting range is available. In the flowchart, at steps #3005 and #3010, the type of the lens and the focal length of the lens are respectively determined and, with normal photo-taking lenses except for macro lenses and the focal length less than 200 mm, the forward scan is performed and the program flow returns.

In order to determine whether or not the forward scan is to be performed relative to the current position of the lens, the microcomputer μC stores, as a ROM table, such relations between the focal length of the lens and the scanning area (the amount of movement from the rearmost position (the value converted into the defocus amount DFs)) as tabulated in Table 3. DFs. In Table 3, there is shown the relationship among the amount DFs of forward movement representative of the scan area in which the forward scan is carried out, the focal length f, and the coverage of the image magnification. This is for the purpose of avoiding the forward movement of the lens because, when the image magnification is great, it cannot be expected that the focus detection is possible only with the left-hand and right-hand islands, and the forward movement of the lens in search for the object at the second island is of no use as far as such a lens position is concerned.

To describe this in reference to the flowchart, based on the data of the focal length inputted from the lens, the amount DFs of forward movement is read out at step #3015. Subsequently, the value of a counter N1 indicative of the current position of the lens is divided by a defocus amount conversion coefficient k at step #3020 to determine the defocus amount DF from the rearmost moved condition, which amount DF is compared with the amount DFs of forward movement at step #3025. If DFs < DF, it means that the focus position of the lens is in a condition moved forward beyond the scan range and, therefore, the program flow returns without the forward scan being performed. On the other hand, if DFs ≦ DF, the program flow proceeds to step #3030 and, in the event that a flag AFSF indicative of start of the focus detection is set, or in the event that 10 seconds has passed since the last time when the forward scan, the focus detection, or the low contrast scan, the flag FSCAF is set to carry out the forward scan, followed by the return of the program. Other than this, the program flow returns without the forward scan being performed (steps #3030 to #3040). If the forward scan is repeatedly performed, a photographer may think that the focus detection is impossible to such an extent and may a trust to the focus detecting function of the camera and, accordingly, it is avoided to effect the forward scan repeatedly.

Figure 17:
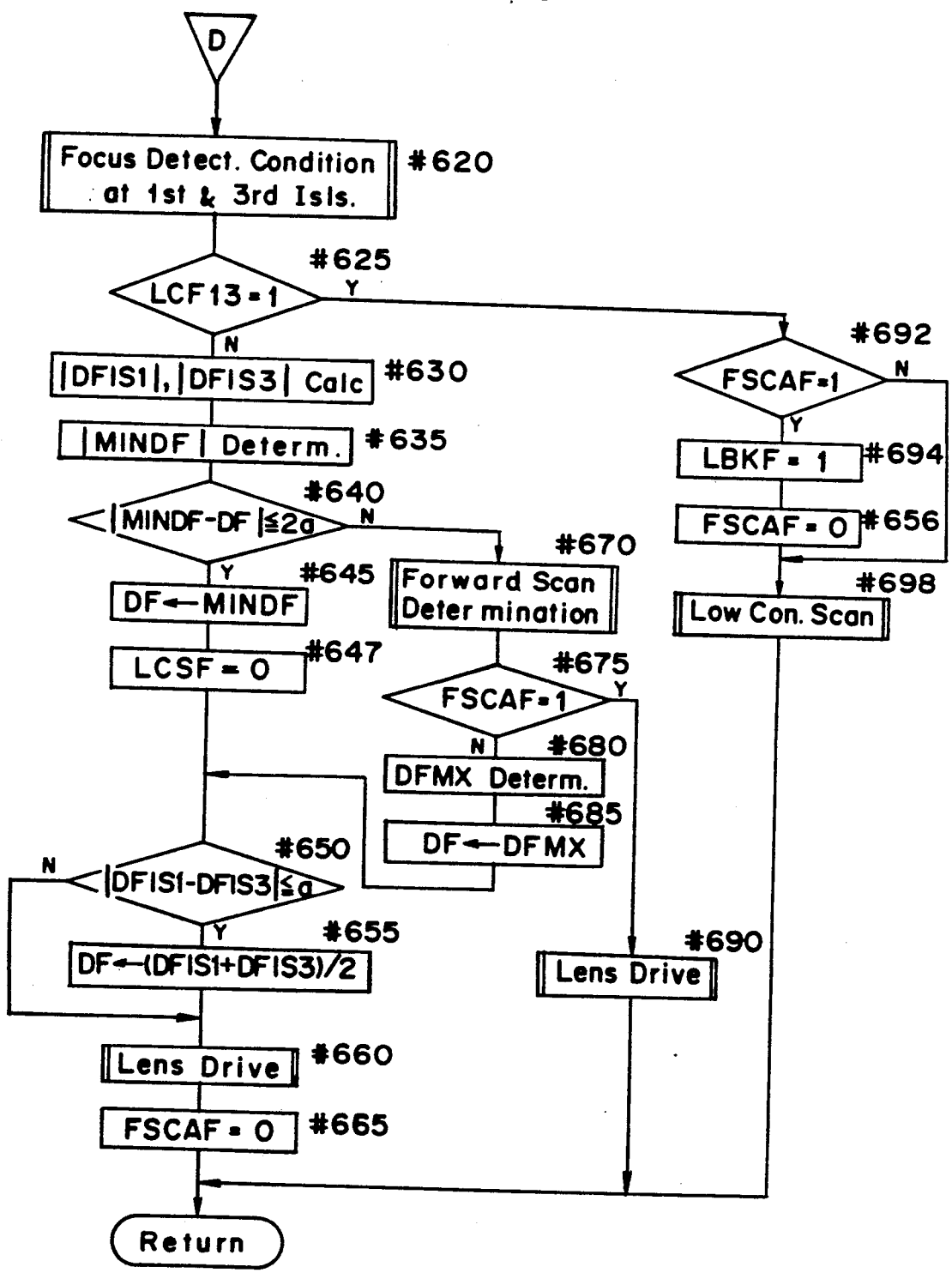
Figure 22:
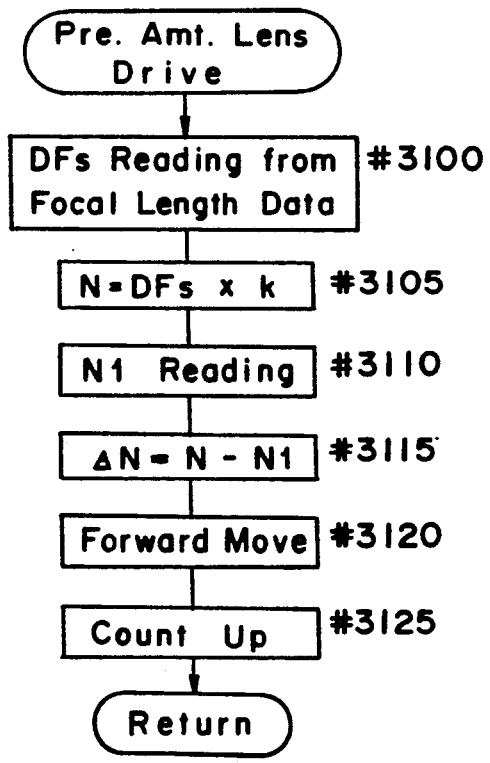

The microcomputer μC, after the process to determine the forward scan has been performed, returns to the flow of FIG. 17 to determine if the flag FSCAF for performing the forward scan is set. If the flag FSCAF is set, the program flow proceeds to step #690 to perform the forward scan. A subroutine for driving the lens by a predetermined amount, which subroutine is performed at step #690, is illustrated in FIG. 22. Referring to FIG. 22, the defocus amount DFs representative of the scan region is read out from the data of the focal length of the lens at step #3100. This defocus amount DFs is multiplied by the conversion coefficient k at step #3105 to determine the number N of rotation of the motor necessary to drive the lens. Subsequently, the counter value N1 indicative of the position of forward movement of the lens is read out at step #3110 to determine the difference ΔN between the number N and the counter value N1 at step #3115. Then, in order to move the lens forwards, a signal for effecting the forward movement of the lens is outputted to the lens control circuit LECON at step #3120 and a count-up command is applied to the counter N1, followed by the return of the program flow. By this return, the focus detecting operation is carried out from step #15 while the lens is moved forwards towards a position corresponding to the number of rotation of ΔN. With this focus detecting operation being performed, if the focus detection at the second island is possible, the operation is carried out from step #390 shown in FIG. 14.

Figure 23:
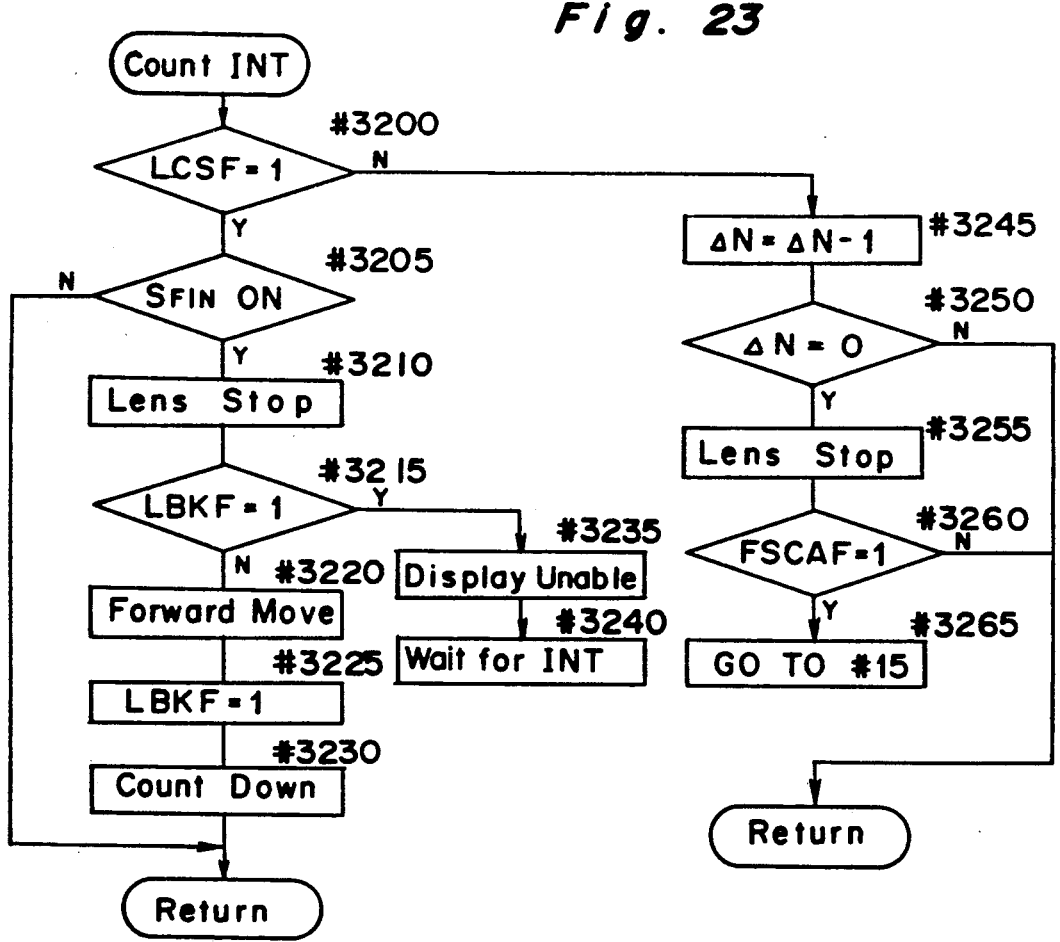

The count interruption for controlling the lens drive at this time will now be described with reference to the flowchart of FIG. 23. This count interruption is carried out each time a pulse is supplied from the encoder ENC. At the outset, the microcomputer μC determines if the flag LCSF indicative of the low contrast scan is set. If it is set, the program flow from step #3205, et seqq., is executed. This will be described in connection with the low contrast scan later. If the flag LCSF is not set, the program flow proceeds to step #3245 at which 1 is subtracted from ΔN to determine ΔN newly, followed by a decision at step #3250 to determine if the new ΔN becomes 0. If ΔN ≠ 0, the program flow returns, but if ΔN = 0, it means that, in the case of the forward scan, the lens is in the condition in which the lens is moved forwards the most distance and, therefore, the microcomputer μC causes the lens control circuit LECON to perform a lens stopping control. If it is not the case with the forward scan, ΔN = 0 means that the lens drive based on the defocus amount resulting from the normal focus detecting operation has been completed, and therefore, the lens stopping control is equally carried out. Thereafter, the microcomputer μC determines if the flag FSCAF indicative of the forward scan is set. If this flag is set, that is, in the case of the forward scan mode, the program flow proceeds to step #15 at which the focus detecting operation from the integration is carried out while the lens is held still, but if it is not set, it means that the normal focus detecting operation is performed, the program flow returns (steps #3260 and #3265).

Referring back to FIG. 17, at step #675, in the event that the flag FSCAF indicative of the forward scan is not set, determination is made at step #680 of the maximum defocus amount DFMX which is the defocus amount of the object closest to the camera and it is used as the defocus amount DF for the lens drive at step #685. Subsequently, the program flow proceeds to step #650 at which a decision is made to determine if the object of the first island and that of the third island are in the neighborhood with respect to each other, that is, if the absolute value of the difference between the respective defocus amounts DFIS1 and DFIS3 is within the predetermined value a. If the absolute value is within the predetermined value a, it means that the objects are in the neighborhood with each other and, therefore, the sum of the defocus amounts DFIS1 and DFIS3 divided by 2 is used as the defocus amount DF (steps #650 and #655). Regardless of whether the absolute value is within the predetermined value a or not, the lens drive is effected on the basis of the defocus amount DF so determined and, since the forward scan is not carried out, the flag FSCAF indicative of the forward scan is reset, followed by the return of the program flow (steps #660 and #665).

When the flag LCF13 indicative of the incapability of the focus detection by the first and third islands is set at step #625, all of the islands are deemed to be unable to perform the focus detection and, therefore, the program flow proceeds to step #692. During step #692, a decision is made during the course of the forward scan to determine if the focus detection become impossible. The incapability of the focus detection during the forward scan occurs when the object of the first or third island is in a front focus condition (on a further side from the distance representative of the focus position of the lens) before the forward scan is performed, because as a result of the forward movement of the lens from this condition by the control of the forward scan the defocus amount is increased to a value greater than the defocus amount with which the focus detection is possible. In such case, even when the lens is moved forwards from the forward scan region, there is a high probability that the object will not exist on the second island, and, therefore, the focus detection is carried out by moving the lens rearwards in order to focus the object detected before the forward scan is performed.

Figure 24:
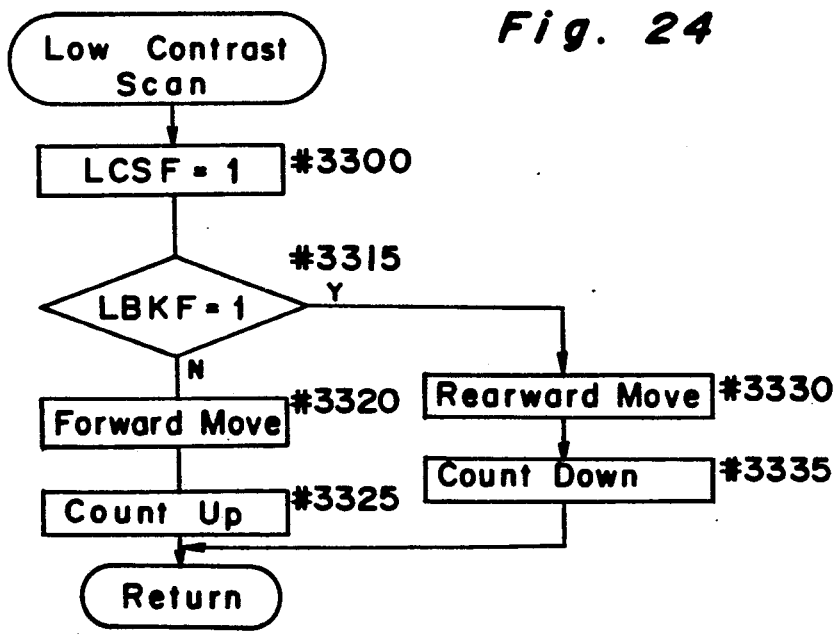

This will now be described with reference to the flowchart. When the flag FSCAF is set, a flag LBKF indicative of the control for moving the lens rearwards is set, followed by the setting of the flag FSCAF in order to interrupt the forward scan, thereby to accomplish the low contrast control (steps #692 to #698). Thereafter, the program flow returns. The subroutine for this low contrast scan is illustrated in FIG. 24. Referring to FIG. 24, the flag LCSF indicative of the low contrast scan is set at step #3300, followed by a decision at step #3315 to determine if the flag LBKF is set. If the flag LBKF is set, a control signal necessary to move the lens rearward is supplied to the lens control circuit LECON at step #3330 and a countdown command is applied to the counter N1 at step #3335. Where the flag LBKF is not set, the control signal necessary to move the lens forward is supplied to the lens control circuit LECON at step #3320 and a count-up command is applied to the counter N1 at step #3325, followed by the return of the program flow.

Such a lens drive control effected will now be described with reference to the program flow of FIG. 23 starting from step #3205. When the pulse is supplied from the encoder, the count interruption is executed and, since the flag LCSF indicative of the low contrast is set, the program flow proceeds to step #3205 at which a decision is made to determine if the lens has been moved to a terminal position, that is, if a switch $S_{FIN}$ is not turned on. If the switch $S_{FIN}$ is not turned on (when IP3 is in a high level state), the program flow returns immediately. On the other hand, if the switch is turned on (when IP3 is in a low level state), the lens is immediately controlled to stop and a decision is made at step #3215 to determine if the flag LBKF indicative of the control for the rearward movement of the lens is set. If the flag LBKF is not set, it means that the lens has been controlled to move forwards so as to arrive at the terminal position before and, therefore, the control of moving the lens rearwards is carried out at step #3220 and the flag LBKF indicative thereof is set at step #3225. Thereafter, the count-down command is applied to the counter N1 at step #3230, followed by the return of the program flow. Where the flag LBKF is set, the display circuit DISP is caused at step #3235 to show a display to the effect that the focus detection is impossible because the drive of the lens will not result in the detection of the focus, followed by the wait at step #3240 for the interruption without the focus detection being performed.

Figure 19:
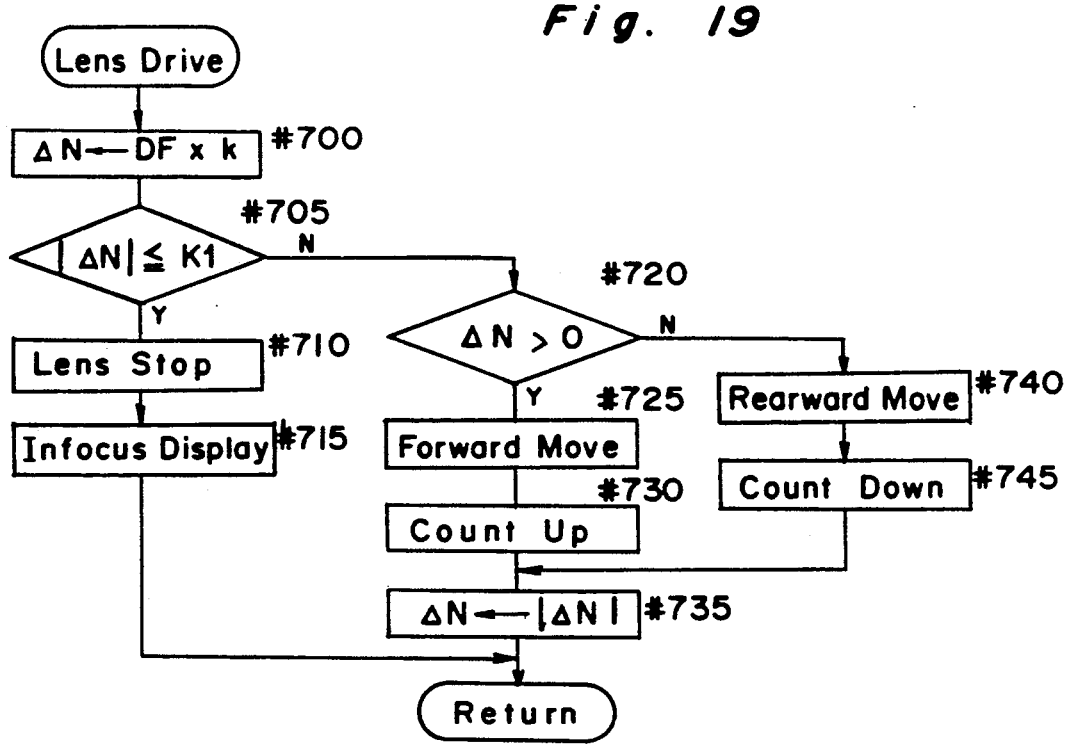

The flowchart for the lens drive shown in FIG. 19 will now be described.

By multiplying the defocus amount DF obtained times the coefficient k for the conversion of the defocus amount DF into the amount of drive of the motor, the rotational number ΔN of the motor is determined at step #700. Subsequently, a decision is made at step #720 to determine if the absolute value of the rotational number ΔN is within a predetermined value K1 representative of the infocus range. If the absolute value of the rotational number ΔN is within the predetermined value K1, it means of the infocus condition and, therefore, a lens stop signal is outputted at step #710 to the lens control circuit LECON, followed by the display performed by the display circuit DISP at step #715 to provide an indication of the infocus condition, after which the program flow returns. On the other hand, if the absolute value of the rotational number ΔN exceeds the predetermined value K1, a decision is made at step #705 to determine if the rotational number ΔN is a positive value. If the rotational number ΔN is the positive value, the control signal necessary to move the lens forwards later is supplied to the lens control circuit LECON at step #725, followed by the outputting at step #730 of a signal necessary to perform a count-up control to a counter indicative of the rotational number of the motor from the infinity position. On the other hand, if the rotational number ΔN is not the positive value, the control signal necessary to move the lens rearward is outputted to the lens control circuit LECON at step #740, followed by the outputting at step #745 of a signal necessary to perform a count-down control to the counter. Thereafter, the absolute value of the rotational number ΔN is rendered to be the counted number ΔN at step #735, followed by the return of the program flow.

Hereinafter, an alternative method by which the object distance, that is, the camera-to-object distance, necessary to determine the photo-taking magnification will now be described.

Assuming that DFo stands for the amount of forward movement of the lens from the infinity position to the current position, d stands for the photo-taking distance at the current position and f stands for the focal length of the lens, all of these parameters may be assumed to have the following relationship.

$d = f^2 / Dfo$

The value N of a pulse counter used to monitor the condition in which the lens is moved rearwards to the current position from an extreme position and the amount DFo of forward movement of the lens generally exhibit a proportional relationship with each other as expressed below.

$N = K \times Dfo$ (wherein k represents a constant.)

In view of the foregoing, the photo-taking distance with the lens held at the current position can be expressed as follows.

$d = f^2 \cdot k / N$

The logarithm of the above equation is as follows.

$log_2 d = log_2 f^2 \cdot k - log_2 N$ $log_2 d^2 = DV_\infty - 2 log_2 N$ (wherein $DV_\infty = 2 log_2 f^2 \cdot k$)

When the photo-taking distance is expressed $Dv_\infty = log_2 d^2$ according to the APEX system, the following equation can be obtained.

$Dv = Dv_\infty - 2 log_2 N$      (*)

Now, the calculation in the camera is performed on the APEX system and, therefore, if in the equation (*) $Dv_\infty$ is obtained in the form of an APEX value as information peculiar to the lens and the number N of the pulses representative of the forward movement of the lens is converted into the APEX system, the photo-taking distance Dv can be obtained in terms of the APEX system value.

The method for converting the amount N of forward movement into the APEX system value will now be described. In the first place, $log_2 N = Dvn/2$ is determined. As can be understood from this equation, when $N = 1$, that is, when the lens is moved forward a distance corresponding to one pulse, Dvn/2 will become zero and, therefore, from the equation (*), the distance Dv at this time is equal to $Dv_\infty$.

Where the number N of the pulses for the lens forward movement is greater than or equal to 2, the number of digits N of bits bn set to 1 is taken as an integral number N and four digits in the least places thereto are rendered to be decimals having respective weights of ½, ¼, ⅛ and 1/16 while places least thereto are neglected. By way of example, if ... $b_9b_8b_7b_6b_5$... = ... 10111 ... (a bit greater than $b_{10}$ is zero), it will be (9 + 7/16) and, if ... $b_{12}b_{11}b_{10}b_9b_8$... = ... 11010 ... (a bit greater than $b_{13}$ is zero), it will be (12 + 10/16) which is rendered to be $log_2 N$. By doubling this value, $2log_2 N$ is obtained. In the above example, doubling (9 + 7/16) gives (18 + 7/8) and doubling (12 + 10/16) gives (24 + 10/8)=(25 + 2/8). Then, Dv can be determined on the basis of the equation (*). Although a slight error (0.1 Dv) may occur in the value of Dv, it can be negligible. With respect to the value of $Dv_\infty$, it can be obtained by adding 2 to the value of Dv corresponding to the distance at which the lens is focused at the time the pulse number N is 2, that is, at the time the $bit_1$ is set to 1.

The photo-taking distance Dv so determined in the manner as hereinabove described represents information associated with the photo-taking distance d relative to the current lens position. The distance x to the object exhibiting a certain defocus amount DF relative to the current lens position can be determined by rendering the value of the counter indicative of the current lens position to be N and determining $\Delta N = k \cdot DF$ indicative of the lens drive amount to give $N = N + \Delta N$ which is to be applied to the above equation. By so doing, the photo-taking distance (the object distance) at the object position of the lens will be expressed as follows.

$$x = f^2 \cdot k / (N + \Delta N)$$

The logarithm of the above equation will give as follows.

$$log_2 x = log_2 f^2 \cdot k - log_2(N + \Delta N)$$

$$Dv = Dv_\infty - 2log_2(N + \Delta N)$$
wherein;

$$Dv = log_2 x^2 \text{ and } Dv_\infty = 2log_2 f^2 \cdot k$$

The photo-taking magnification at the object position is $\beta = f/x$ and, therefore;

$$log_2 \beta = log_2 f - log_2 x$$

$$2log_2 \beta = 2log_2 f - Dv$$

Accordingly, the data of the focal length may suffice to be stored as $2log_2 f$ or $log_2 f$ of the APEX system and the photo-taking magnification $\beta$ may suffice to be stored in the form of a value of $(2log_2 f - Dv)$ in the ROM table.

It is to be noted that, where the photo-taking magnification can be directly obtained from a lens such as a lens equipped with an encoder for the photo-taking magnification or a lens equipped with a microcomputer for the calculation of the photo-taking magnification, no calculation is needed to be performed in the camera.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An automatic focus condition detecting device comprising:
   an objective lens;
   first means for receiving light from an object in a first focus detecting area through said objective lens;
   first means responsive to the output of said first receiving means for detecting a focus condition of said objective lens;
   first means responsive to the output of said first receiving means for judging whether or not it is possible for said first means to detect a focusing condition of said objective lens;
   second means for receiving light from an object in a second focus detecting area, which is different from the first focus detecting area, through said objective lens;
   second means responsive to the output of said second receiving means for detecting a focus condition of said objective lens;
   second means responsive to the output of said second receiving means for judging whether or not it is possible for said second detecting means to detect a focusing condition of said objective lens;
   means for assisting in making it possible to detect a focusing condition of said objective lens; and
   means for activating said assisting means, responsive at least to said first judging means, when said first judging means judges that it is impossible for said first detecting means to detect a focusing condition and, moreover, said second judging means judges that it is possible for said second detecting means to detect a focusing condition.

2. The device as claimed in claim 1, further comprising means for calculating a defocus amount based on data outputted from said first detecting means when said first judging means judges that it is possible for said first detecting means to detect a focusing condition with said assisting means activated, and for calculating a defocus amount based on data outputted from said second detecting means when said first judging means judges that it is impossible for said first detecting means to detect a focusing condition even if said assisting means is activated.

3. The device as claimed in claim 1 wherein said first focus detecting area is centered in a field to be photographed.

4. The device as claimed in claim 1 further comprising second means for activating said assisting means when said first and second judging means judge that it is impossible for said first and second detecting means to detect a focusing condition, respectively.

5. An automatic focus condition detecting device comprising:
   an objective lens;

first means for receiving light from an object in a first focus detecting area through said objective lens;

first means responsive to the output of said first receiving means for detecting a focus condition of said objective lens;

first means responsive to the output of said first receiving means for judging whether or not it is possible for said first detecting means to detect a focusing condition of said objective lens;

second means for receiving light from an object in a second focus detecting area, which is different from the first focus detecting area, through said objective lens;

second means responsive to the output of said second receiving means for detecting a focus condition of said objective lens;

second means responsive to the output of said second receiving means for judging whether or not it is possible for said second detecting means to detect a focusing condition of said objective lens;

means for assisting in making it possible to detect a focusing condition of said objective lens; and means for activating said assisting means in response to said first judging means judging that it is impossible for said first detecting means to detect a focusing condition even if said second judging means judges that it is possible for said second detecting means is to detect a focusing condition.

6. The device as claimed in claim 5, wherein said activating means includes first means for activating said assisting means when said first judging means judges that it is impossible for said first detecting means to detect a focusing condition and said second judging means judges that it is possible for said second detecting means to detect a focusing condition, and second means for activating said assisting means when said first and second detecting means judge that it is impossible for said first and second detecting means to detect a focusing condition, respectively.

7. The device as claimed in claim 6, wherein said assisting means operates in response to said first activating means in a first mode and to said second activating means in a second mode.

8. An automatic focus condition detecting device comprising:

an objective lens;

first means for receiving light from an object in a first focus detecting area through said objective lens;

first means responsive to the output of said first receiving means for detecting a focus condition of said objective lens;

first means responsive to the output of said first receiving means for judging whether or not it is possible for said first detecting means to detect a focusing condition of said objective lens;

second means for receiving light from an object in a second focus detecting area, which is different from the first focus detecting area, through said objective lens;

second means responsive to the output of said second receiving means for detecting a focus condition of said objective lens;

second means responsive to the output of said second receiving means for judging whether or not it is possible for said second detecting means to detect a focusing condition of said objective lens;

means for assisting in making it possible to detect a focusing condition of said objective lens; and means for activating said assisting means, responsive at least to said first judging means, when said first judging means judges that it is impossible for said first detecting means to detect a focusing condition regardless of the detection by said second detecting means.

* * * * *